(12) United States Patent
Lakshmanan

(10) Patent No.: US 10,754,063 B2
(45) Date of Patent: Aug. 25, 2020

(54) SUPERVISED NEURAL NETWORK TO PREDICT UNLABELED RAIN RATES

(71) Applicant: THE CLIMATE CORPORATION, San Francisco, CA (US)

(72) Inventor: Valliappa Lakshmanan, Bellevue, WA (US)

(73) Assignee: THE CLIMATE CORPORATION, San Francisco, CA (US)

( * ) Notice: Subject to any disclaimer, the term of this patent is extended or adjusted under 35 U.S.C. 154(b) by 226 days.

(21) Appl. No.: 15/182,138

(22) Filed: Jun. 14, 2016

(65) Prior Publication Data
US 2017/0357029 A1    Dec. 14, 2017

(51) Int. Cl.
| | | |
|---|---|---|
| *G01W 1/00* | (2006.01) | |
| *G01W 1/10* | (2006.01) | |
| *G01S 7/41* | (2006.01) | |
| *G01S 13/95* | (2006.01) | |
| *G06Q 10/04* | (2012.01) | |
| *G06Q 50/26* | (2012.01) | |
| *G06Q 50/30* | (2012.01) | |

(52) U.S. Cl.
CPC .............. *G01W 1/10* (2013.01); *G01S 7/417* (2013.01); *G01S 13/951* (2013.01); *G06Q 10/04* (2013.01); *G06Q 50/265* (2013.01); *G06Q 50/30* (2013.01); *Y02A 90/18* (2018.01)

(58) Field of Classification Search
CPC .................................. G01W 1/10; G01S 13/95
USPC .......................................................... 702/3
See application file for complete search history.

(56) References Cited

U.S. PATENT DOCUMENTS

| | | | | |
|---|---|---|---|---|
| 5,140,523 A | * | 8/1992 | Frankel | G01W 1/10 340/601 |
| 8,712,148 B2 | * | 4/2014 | Paris | G06T 11/00 345/589 |
| 8,738,243 B2 | * | 5/2014 | Sauder | A01B 79/005 111/200 |
| 8,767,194 B2 | * | 7/2014 | Preiner | G01N 21/276 356/244 |
| 2014/0303893 A1 | * | 10/2014 | LeBlanc | G01W 1/10 702/3 |
| 2015/0094916 A1 | * | 4/2015 | Bauerer | A01C 7/105 701/50 |
| 2017/0017014 A1 | * | 1/2017 | Kleeman | G01W 1/10 |

(Continued)

*Primary Examiner* — Michael P Nghiem
(74) *Attorney, Agent, or Firm* — Hickman Palermo Becker Bingham LLP; Malgorzata A. Kulczycka

(57) ABSTRACT

In an embodiment, radar observation data for time points are received at an input layer of a rain rate prediction neural network. The radar observations are forward propagated via hidden layers of the network to determine rain rates for the time points. The rain rates are integrated over a time period, determined based on the time points, to determine a predicted rainfall amount. The predicted rainfall amount is compared with an actual rainfall amount, determined based on received rainfall measurements, to determine an error. If the error does not satisfy certain criteria, then the error is apportioned to each of the time points, the apportioned errors are back propagated via the hidden layers, and weights associated with nodes in the hidden layers are updated. The radar observation data is again forward propagated via the layers, multiplied by the updated weights, and used to determine new rain rates.

20 Claims, 10 Drawing Sheets

(56) References Cited

U.S. PATENT DOCUMENTS

| | | | |
|---|---|---|---|
| 2017/0075034 A1* | 3/2017 | Kleeman | G01W 1/10 |
| 2017/0090068 A1* | 3/2017 | Xiang | G01W 1/10 |
| 2017/0261645 A1* | 9/2017 | Kleeman | G06Q 10/04 |
| 2017/0300602 A1* | 10/2017 | Leeds | G06F 17/5009 |
| 2017/0329048 A1* | 11/2017 | Lemos | G01W 1/10 |
| 2017/0336533 A1* | 11/2017 | Alvarez | G01S 13/95 |
| 2017/0351005 A1* | 12/2017 | Alvarez | G01S 13/95 |
| 2017/0351963 A1* | 12/2017 | Leeds | G06N 7/005 |
| 2018/0024271 A1* | 1/2018 | Koch | G01W 1/02 |
| 2018/0108123 A1* | 4/2018 | Baurer | G06F 16/5838 |

\* cited by examiner

Fig. 2
(a)

200 Mobile Computer Application

- 208 Seeds and Planting Instructions
- 210 Nitrogen Instructions
- 212 Weather Instructions
- 214 Field Health Instructions
- 216 Performance Instructions 206 Digital Map Book 205 Script Generation Instructions 204 Overview and Alert Instructions 202 Account, Fields, Data Ingestion, Sharing Instructions

(b)

220 Cab Computer Application

- 222 Maps - Cab
- 224 Remote View
- 226 Data Collect and Transfer
- 228 Machine Alerts
- 230 Script Transfer 232 Scouting - Cab

FIG. 5

Data Manager

| | Nitrogen | Planting | Practices | Soil | |
|---|---|---|---|---|---|

| Planting 1(4 Fields) | Planting 2(0 Fields) | Planting 3(0 Fields) | Planting 4(1 Fields) | Add New |
| Crop Corn Product | Crop Corn Product | Crop Corn Product | Crop Corn Product | Planting Plan |
| Plant Date: 2016-04-12 | Plant Date: 2016-04-15 | Plant Date: 2016-04-13 | Plant Date: 2016-04-13 | |
| ILU 112 | Pop: 34000 | ILU 83 | Pop: 34000 | ILU 83 | Pop: 34000 | ILU 112 | Pop: 34000 | |
| [Edit] [Apply] | [Edit] [Apply] | [Edit] [Apply] | [Edit] [Apply] | |

| | CROP | PLANTED ACRES | PRODUCT | RELATIVE MATURITY | TARGET YIELD | POPULATION(AVG) | PLA |
|---|---|---|---|---|---|---|---|
| ☐ Select All | | | | | | | |
| ☐ Ames, IA 1<br>Corn \| 100 \| Boone, IA | Corn | — | DMC82-M | 112 | 160 | 34000 | Apr |
| ☐ Austin, MN 1<br>Corn \| 100 \| Fredricks, MN | Corn | — | DMC82-M | 114 | 160 | 36000 | Apr |
| ☐ Boone, IN 1<br>Corn \| 100 \| Boone, IA | Corn | — | DMC82-M | 112 | 150 | 34000 | Apr |
| ☐ Champaign 1<br>Corn \| 100 \| Champaign, IL | Corn | — | — | 112 | 200 | 34000 | Apr |
| ☐ E Nebraska 1<br>Corn \| 100 \| Burt, NE | Corn | — | — | 112 | 160 | 34000 | Apr |

FIG. 6

Rain Rate Prediction Model Implemented in a Neural Network

SUPERVISED NEURAL NETWORK TO PREDICT UNLABELED RAIN RATES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. ©2015 The Climate Corporation.

FIELD OF THE DISCLOSURE

The present disclosure generally relates to computer-based prediction of rainfall for use in agricultural applications. The present disclosure more specifically relates to using a computer programmed with a supervised neural network to predict unlabeled rain rates.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Future precipitation may be forecasted based on various measurements, including actual rainfall measurements collected in the past. Rainfall is usually measured using rain gauges that gather and measure the amounts of precipitation accumulated in the gauge over a period of time. Unfortunately, rain gauges have many limitations. For example, a rain gauge usually indicates the amount of rainfall in a localized area, and thus collecting rainfall measurements from a large region may require installing and maintaining a large quantity of gauges. Furthermore, a rain gauge may provide inaccurate readings in high-wind weather conditions and in cold weather conditions. During these conditions, rain droplets may freeze around a funnel of the gauge and fail to pass through to the gauge measuring compartment, causing errors in the gauge's readings.

Due to the shortcomings of rain gauges, meteorologists have turned into other tools. For example, they have been using various radars configured to measure atmospheric conditions that occurred in the past and present, and applying the collected information to make educated guesses about the upcoming weather.

SUMMARY

The appended claims may serve as a summary of the disclosure.

BRIEF DESCRIPTION OF THE DRAWINGS

In the drawings:

FIG. 2 illustrates two views of an example logical organization of sets of instructions in main memory when an example mobile application is loaded for execution.

FIG. 5 depicts an example embodiment of a timeline view for data entry.

FIG. 6 depicts an example embodiment of a spreadsheet view for data entry.

DETAILED DESCRIPTION

Figure 1:
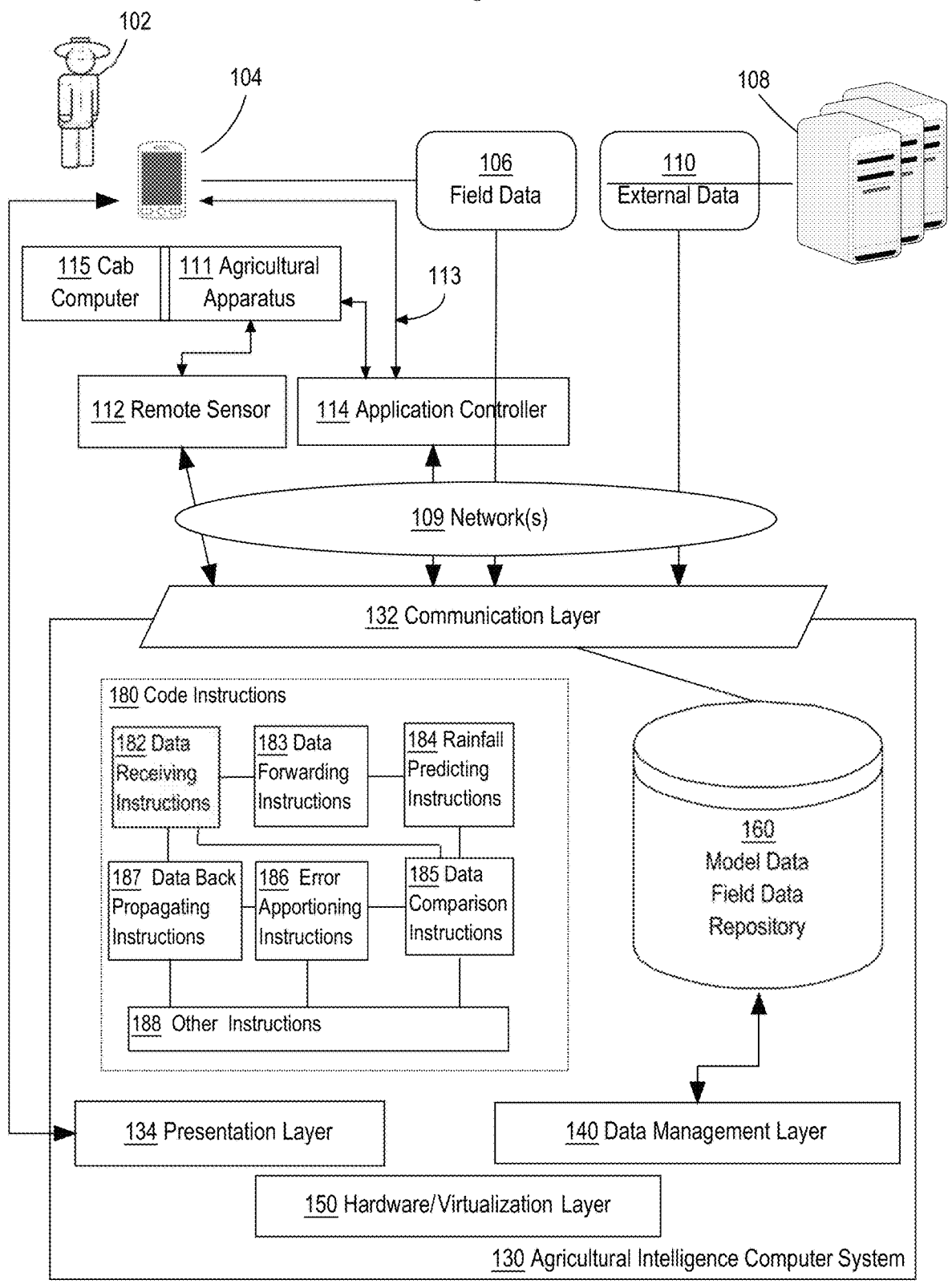
FIG. 1 illustrates an example computer system that is configured to perform the functions described herein, shown in a field environment with other apparatus with which the system may interoperate.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are disclosed in sections according to the following outline:

1. GENERAL OVERVIEW
2. EXAMPLE AGRICULTURAL INTELLIGENCE COMPUTER SYSTEM
   2.1. STRUCTURAL OVERVIEW
   2.2. APPLICATION PROGRAM OVERVIEW
   2.3. DATA INGEST TO THE COMPUTER SYSTEM
   2.4. PROCESS OVERVIEW—AGRONOMIC MODEL TRAINING
   2.5. IMPLEMENTATION EXAMPLE—HARDWARE OVERVIEW
3. SUPERVISED NEURAL NETWORK WITH UNKNOWN TRUTH
   3.1. PROCESS OVERVIEW
   3.2. RADAR OBSERVATIONS
   3.3. NEURAL NETWORK TRAINING
   3.4. COMPUTING RAIN RATES FOR A TIME PERIOD
   3.5. FORWARD PROPAGATION
4. BACK PROPAGATING A RAIN RATE PREDICTION MODEL
   4.1. PROCESS OVERVIEW
   4.2. ERROR COMPUTATION
   4.3. EXAMPLE WORKFLOW
5. WEIGHTS
6. VARIATIONS
7. TRAINING DATASETS
8. APPROXIMATING AND INTERPOLATING RADAR DATA
9. EXTENSIONS
   1. General Overview In an embodiment, a data processing method comprises using instructions programmed in a computer system comprising one or more processors and computer memory, receiving, at an input layer of a rain rate prediction neural network, radar observation data for a plurality of time points; using the instructions programmed in the computer system, forward propagating the radar observation data via the rain rate prediction neural network to determine a plurality of rain rates for the plurality of time points; using the instructions programmed in the computer system, determining, based on the plurality of rain rates, a predicted rainfall amount for a time period determined based on the plurality of time points; using the instructions programmed in the computer system, comparing the predicted rainfall amount with an actual rainfall amount determined based on received rainfall measurements to determine an error difference value; in response to determining that the error difference value does not satisfy one or more criteria: using the instructions programmed in the computer system, apportioning the error difference value to each time point of the plurality of time points; using the instructions programmed in the computer system, backward propagating corresponding apportioned error difference values via the rain rate prediction neural network to update a plurality of weights associated with nodes of rain rate prediction neural network; using the instructions programmed in the computer system, forward propagating the radar observation data multiplied by the updated plurality of weights associated with the nodes to determine a new plurality of rain rates for the plurality of time points In an embodiment, a computer is programmed with a neural network that is trained to fit radar observations to rainfall measurements. Radar observations may be obtained from rain radar systems that provide indirect measures of rainfall, whereas direct measurements of rainfall may be obtained from physical rain gauges. Both the radar observations and rainfall measurements are used to train the neural network. Once trained, the network is used under computer control to predict rainfall based on new instantaneous radar observations. The presented approach solves the problem of using indirect measures of rainfall and direct measures of rainfall to train a neural network to predict future rainfall in a more accurate and efficient manner than in past approaches.

Embodiments address specific shortcomings of neural network implementations that have precluded the use of neural networks in rainfall prediction in the past. For example, standard neural networks are usually trained with sets of data for which the right answer ("truth") is known. In contrast, the presented approach is directed to training a neural network to predict rain rates, but using rain gauge data as the "truth." In the presented approach, the "truth" desired for a neural network includes instantaneous rain rates. The available information, such as rain gauge data, is integrated over a time period, such as an hour. The back propagation of the difference between the rain gauge data and the neural network rain rate sum solves the problem and allows using the rain gauge data to train the neural network to predict rain rates. Effective prediction of rainfall using the neural network involves training the network using rain gauge accumulations, but providing output in a different form, such as an instantaneous rain rate prediction.

2. Example Agricultural Intelligence Computer System
2.1 Structural Overview

FIG. 1 illustrates an example computer system that is configured to perform the functions described herein, shown in a field environment with other apparatus with which the system may interoperate. In one embodiment, a user 102 owns, operates or possesses a field manager computing device 104 in a field location or associated with a field location such as a field intended for agricultural activities or a management location for one or more agricultural fields. The field manager computer device 104 is programmed or configured to provide field data 106 to an agricultural intelligence computer system 130 via one or more networks 109.

Examples of field data 106 include (a) identification data (for example, acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (for example, crop type, crop variety, crop rotation, whether the crop is grown organically, harvest date, Actual Production History (APH), expected yield, yield, crop price, crop revenue, grain moisture, tillage practice, and previous growing season information), (c) soil data (for example, type, composition, pH, organic matter (OM), cation exchange capacity (CEC)), (d) planting data (for example, planting date, seed(s) type, relative maturity (RM) of planted seed(s), seed population), (e) fertilizer data (for example, nutrient type (Nitrogen, Phosphorous, Potassium), application type, application date, amount, source, method), (f) pesticide data (for example, pesticide, herbicide, fungicide, other substance or mixture of substances intended for use as a plant regulator, defoliant, or desiccant, application date, amount, source, method), (g) irrigation data (for example, application date, amount, source, method), (h) weather data (for example, precipitation, temperature, wind, forecast, pressure, visibility, clouds, heat index, dew point, humidity, snow depth, air quality, sunrise, sunset), (i) imagery data (for example, imagery and light spectrum information from an agricultural apparatus sensor, camera, computer, smartphone, tablet, unmanned aerial vehicle, planes or satellite), (j) scouting observations (photos, videos, free form notes, voice recordings, voice transcriptions, weather conditions (temperature, precipitation (current and over time), soil moisture, crop growth stage, wind velocity, relative humidity, dew point, black layer)), and (k) soil, seed, crop phenology, pest and disease reporting, and predictions sources and databases.

A data server computer 108 is communicatively coupled to agricultural intelligence computer system 130 and is programmed or configured to send external data 110 to agricultural intelligence computer system 130 via the network(s) 109. The external data server computer 108 may be owned or operated by the same legal person or entity as the agricultural intelligence computer system 130, or by a different person or entity such as a government agency, non-governmental organization (NGO), and/or a private data service provider. Examples of external data include weather data, imagery data, soil data, or statistical data relating to crop yields, among others. External data 110 may consist of the same type of information as field data 106. In some embodiments, the external data 110 is provided by an external data server 108 owned by the same entity that owns and/or operates the agricultural intelligence computer system 130. For example, the agricultural intelligence computer system 130 may include a data server focused exclusively on a type of data that might otherwise be obtained from third party sources, such as weather data. In some embodiments, an external data server 108 may actually be incorporated within the system 130.

An agricultural apparatus 111 has one or more remote sensors 112 fixed thereon, which sensors are communicatively coupled either directly or indirectly via agricultural apparatus 111 to the agricultural intelligence computer system 130 and are programmed or configured to send sensor data to agricultural intelligence computer system 130. Examples of agricultural apparatus 111 include tractors, combines, harvesters, planters, trucks, fertilizer equipment, unmanned aerial vehicles, and any other item of physical machinery or hardware, typically mobile machinery, and which may be used in tasks associated with agriculture. In some embodiments, a single unit of apparatus 111 may comprise a plurality of sensors 112 that are coupled locally in a network on the apparatus; controller area network (CAN) is example of such a network that can be installed in combines or harvesters. Application controller 114 is communicatively coupled to agricultural intelligence computer system 130 via the network(s) 109 and is programmed or configured to receive one or more scripts to control an operating parameter of an agricultural vehicle or implement from the agricultural intelligence computer system 130. For instance, a controller area network (CAN) bus interface may be used to enable communications from the agricultural intelligence computer system 130 to the agricultural apparatus 111, such as how the CLIMATE FIELDVIEW DRIVE, available from The Climate Corporation, San Francisco, Calif., is used. Sensor data may consist of the same type of information as field data 106.

The apparatus 111 may comprise a cab computer 115 that is programmed with a cab application, which may comprise a version or variant of the mobile application for device 104 that is further described in other sections herein. In an embodiment, cab computer 115 comprises a compact computer, often a tablet-sized computer or smartphone, with a color graphical screen display that is mounted within an operator's cab of the apparatus 111. Cab computer 115 may implement some or all of the operations and functions that are described further herein for the mobile computer device 104.

The network(s) 109 broadly represent any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The sensors 112, controller 114, external data server computer 108, and other elements of the system each comprise an interface compatible with the network(s) 109 and are programmed or configured to use standardized protocols for communication across the networks such as TCP/IP, Bluetooth, CAN protocol and higher-layer protocols such as HTTP, TLS, and the like.

Agricultural intelligence computer system 130 is programmed or configured to receive field data 106 from field manager computing device 104, external data 110 from external data server computer 108, and sensor data from remote sensor 112. Agricultural intelligence computer system 130 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to application controller 114, in the manner described further in other sections of this disclosure.

In an embodiment, agricultural intelligence computer system 130 is programmed with or comprises a communication layer 132, presentation layer 134, data management layer 140, hardware/virtualization layer 150, and model and field data repository 160. "Layer," in this context, refers to any combination of electronic digital interface circuits, microcontrollers, firmware such as drivers, and/or computer programs or other software elements.

Communication layer 132 may be programmed or configured to perform input/output interfacing functions including sending requests to field manager computing device 104, external data server computer 108, and remote sensor 112 for field data, external data, and sensor data respectively. Communication layer 132 may be programmed or configured to send the received data to model and field data repository 160 to be stored as field data 106.

In an embodiment, agricultural intelligence computer system 130 is programmed with or comprises code instructions 180. For example, code instructions 180 may include data receiving instructions 182 which, when executed by one or more processors, cause the processors to perform receiving, over a computer network, electronic digital data comprising radar observations and rain gauge measurements. Code instructions 180 may also include data forwarding instructions 183 which, when executed by the processors, cause forwarding data via hidden layers of a neural network. Furthermore, code instructions 180 may include rainfall predicting instructions 184 which, when executed by the processors, cause determining rainfall amounts from radar observations; data comparison instructions 185 which cause comparing a predicted rain rate amount with actual rainfall measurements; error apportioning instructions 186 which cause apportioning a predicted rain rate amount among nodes in a neural network; data back propagating instructions 187 which cause back propagating of data via hidden layers of a neural network, and other detection instructions 188.

Presentation layer 134 may be programmed or configured to generate a graphical user interface (GUI) to be displayed on field manager computing device 104, cab computer 115 or other computers that are coupled to the system 130 through the network 109. The GUI may comprise controls for inputting data to be sent to agricultural intelligence computer system 130, generating requests for models and/or recommendations, and/or displaying recommendations, notifications, models, and other field data.

Data management layer 140 may be programmed or configured to manage read operations and write operations involving the repository 160 and other functional elements of the system, including queries and result sets communicated between the functional elements of the system and the repository. Examples of data management layer 140 include JDBC, SQL server interface code, and/or HADOOP interface code, among others. Repository 160 may comprise a database. As used herein, the term "database" may refer to either a body of data, a relational database management system (RDBMS), or to both. As used herein, a database may comprise any collection of data including hierarchical databases, relational databases, flat file databases, object-relational databases, object oriented databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

When field data 106 is not provided directly to the agricultural intelligence computer system via one or more agricultural machines or agricultural machine devices that interacts with the agricultural intelligence computer system, the user may be prompted via one or more user interfaces on the user device (served by the agricultural intelligence computer system) to input such information. In an example embodiment, the user may specify identification data by accessing a map on the user device (served by the agricultural intelligence computer system) and selecting specific CLUs that have been graphically shown on the map. In an alternative embodiment, the user 102 may specify identification data by accessing a map on the user device (served by the agricultural intelligence computer system 130) and drawing boundaries of the field over the map. Such CLU selection or map drawings represent geographic identifiers. In alternative embodiments, the user may specify identification data by accessing field identification data (provided as shape files or in a similar format) from the U. S. Department of Agriculture Farm Service Agency or other source via the user device and providing such field identification data to the agricultural intelligence computer system.

In an example embodiment, the agricultural intelligence computer system 130 is programmed to generate and cause displaying a graphical user interface comprising a data manager for data input. After one or more fields have been identified using the methods described above, the data manager may provide one or more graphical user interface widgets which when selected can identify changes to the field, soil, crops, tillage, or nutrient practices. The data manager may include a timeline view, a spreadsheet view, and/or one or more editable programs.

Figure 5:
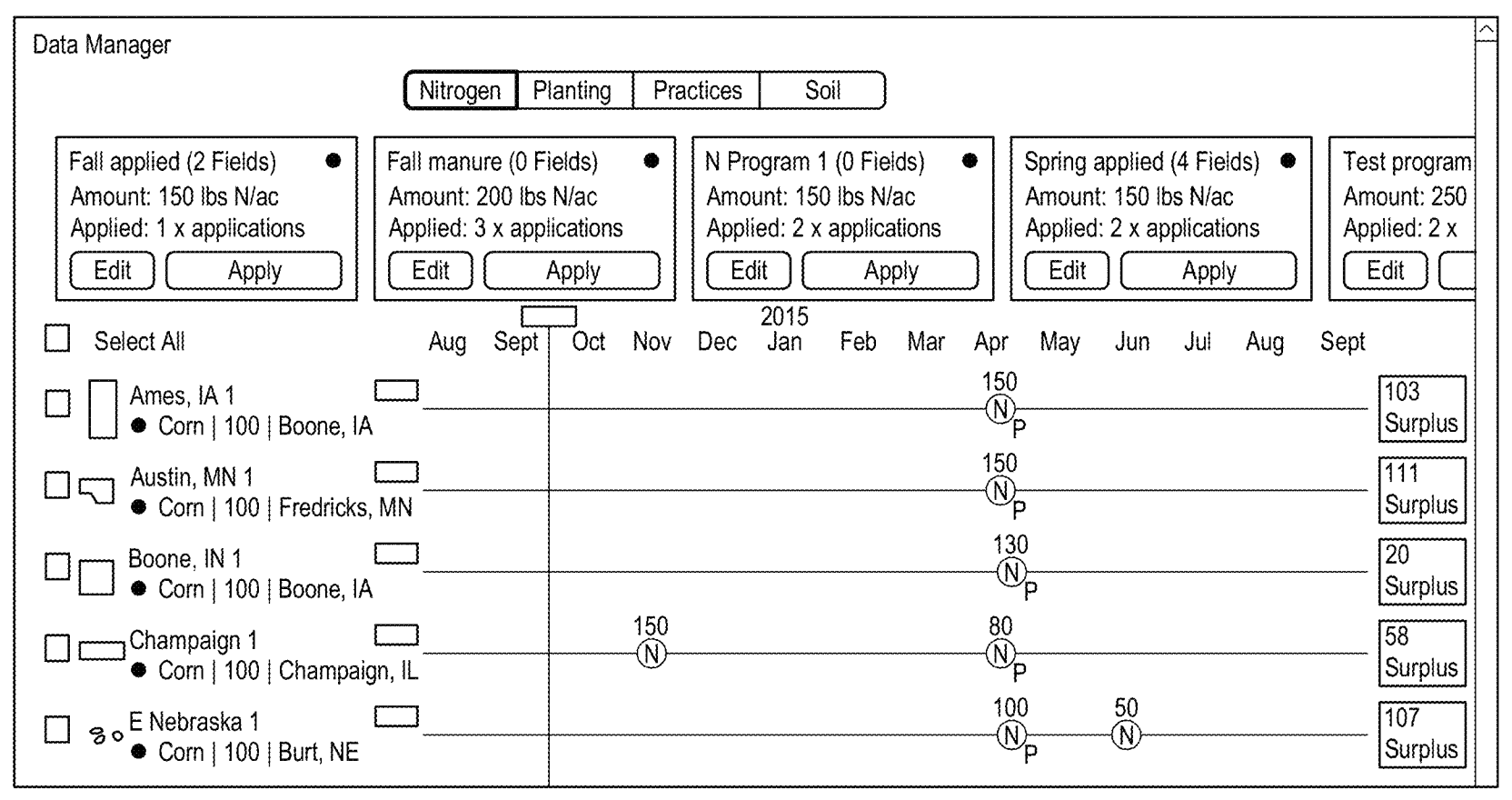

FIG. 5 depicts an example embodiment of a timeline view for data entry. Using the display depicted in FIG. 5, a user computer can input a selection of a particular field and a particular date for the addition of event. Events depicted at the top of the timeline include Nitrogen, Planting, Practices, and Soil. To add a nitrogen application event, a user computer may provide input to select the nitrogen tab. The user computer may then select a location on the timeline for a particular field in order to indicate an application of nitrogen on the selected field. In response to receiving a selection of a location on the timeline for a particular field, the data manager may display a data entry overlay, allowing the user computer to input data pertaining to nitrogen applications, planting procedures, soil application, tillage procedures, irrigation practices, or other information relating to the particular field. For example, if a user computer selects a portion of the timeline and indicates an application of nitrogen, then the data entry overlay may include fields for inputting an amount of nitrogen applied, a date of application, a type of fertilizer used, and any other information related to the application of nitrogen.

In an embodiment, the data manager provides an interface for creating one or more programs. "Program," in this context, refers to a set of data pertaining to nitrogen applications, planting procedures, soil application, tillage procedures, irrigation practices, or other information that may be related to one or more fields, and that can be stored in digital data storage for reuse as a set in other operations. After a program has been created, it may be conceptually applied to one or more fields and references to the program may be stored in digital storage in association with data identifying the fields. Thus, instead of manually entering identical data relating to the same nitrogen applications for multiple different fields, a user computer may create a program that indicates a particular application of nitrogen and then apply the program to multiple different fields. For example, in the timeline view of FIG. 5, the top two timelines have the "Fall applied" program selected, which includes an application of 150 lbs N/ac in early April. The data manager may provide an interface for editing a program. In an embodiment, when a particular program is edited, each field that has selected the particular program is edited. For example, in FIG. 5, if the "Fall applied" program is edited to reduce the application of nitrogen to 130 lbs N/ac, the top two fields may be updated with a reduced application of nitrogen based on the edited program.

In an embodiment, in response to receiving edits to a field that has a program selected, the data manager removes the correspondence of the field to the selected program. For example, if a nitrogen application is added to the top field in FIG. 5, the interface may update to indicate that the "Fall applied" program is no longer being applied to the top field. While the nitrogen application in early April may remain, updates to the "Fall applied" program would not alter the April application of nitrogen.

FIG. 6 depicts an example embodiment of a spreadsheet view for data entry. Using the display depicted in FIG. 6, a user can create and edit information for one or more fields. The data manager may include spreadsheets for inputting information with respect to Nitrogen, Planting, Practices, and Soil as depicted in FIG. 6. To edit a particular entry, a user computer may select the particular entry in the spreadsheet and update the values. For example, FIG. 6 depicts an in-progress update to a target yield value for the second field. Additionally, a user computer may select one or more fields in order to apply one or more programs. In response to receiving a selection of a program for a particular field, the data manager may automatically complete the entries for the particular field based on the selected program. As with the timeline view, the data manager may update the entries for each field associated with a particular program in response to receiving an update to the program. Additionally, the data manager may remove the correspondence of the selected program to the field in response to receiving an edit to one of the entries for the field.

In an embodiment, model and field data is stored in model and field data repository 160. Model comprises data models created for one or more fields. For example, a crop model may include a digitally constructed model of the development of a crop on the one or more fields. "Model," in this context, refers to an electronic digitally stored set of executable instructions and data values, associated with one another, which are capable of receiving and responding to a programmatic or other digital call, invocation, or request for resolution based upon specified input values, to yield one or more stored output values that can serve as the basis of computer-implemented recommendations, output data displays, or machine control, among other things. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. The model may include a model of past events on the one or more fields, a model of the current status of the one or more fields, and/or a model of predicted events on the one or more fields. Model and field data may be stored in data structures in memory, rows in a database table, in flat files or spreadsheets, or other forms of stored digital data.

Figure 4:
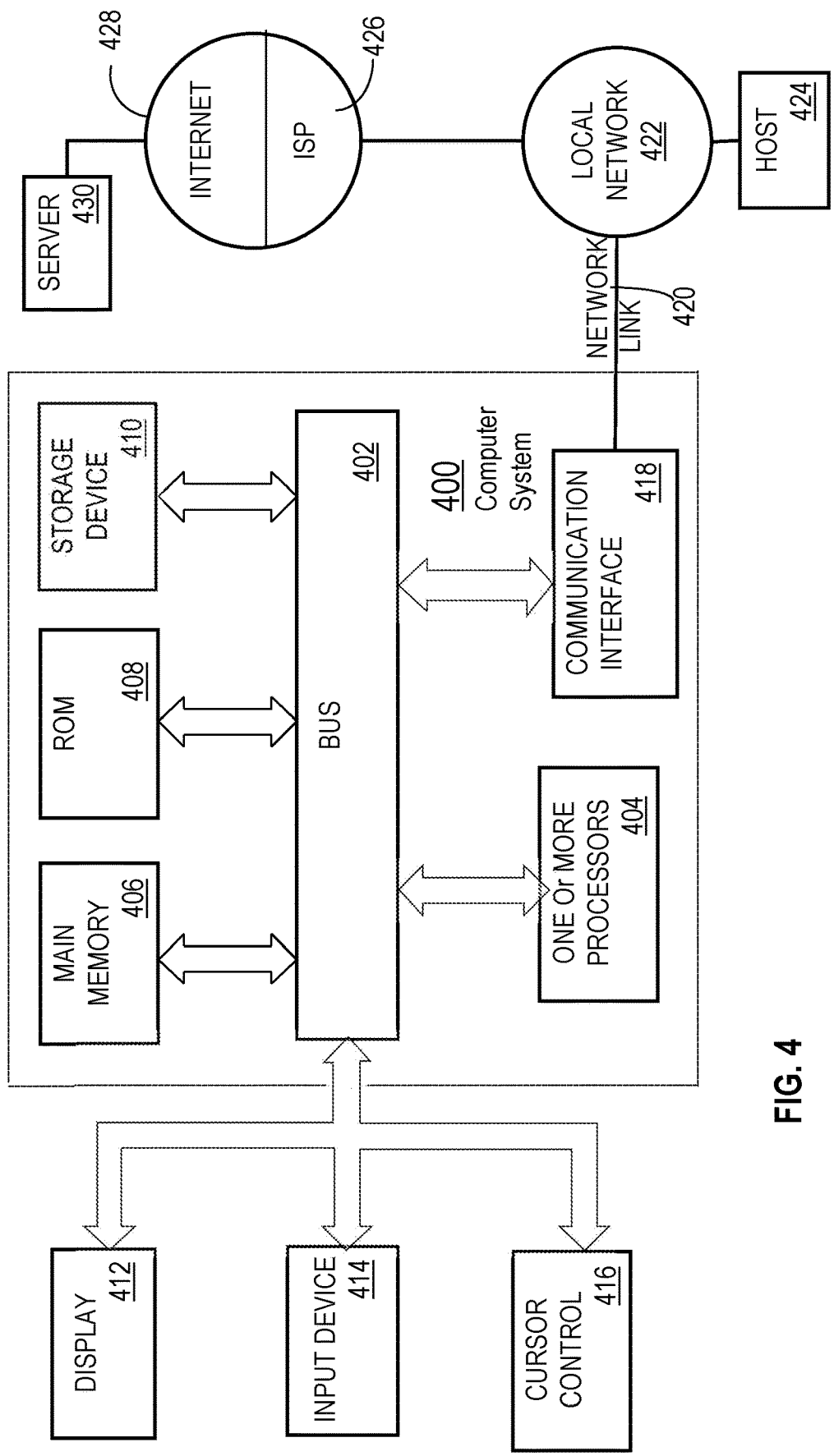
FIG. 4 is a block diagram that illustrates a computer system 400 upon which an embodiment of the invention may be implemented.

Hardware/virtualization layer 150 comprises one or more central processing units (CPUs), memory controllers, and other devices, components, or elements of a computer system such as volatile or non-volatile memory, non-volatile storage such as disk, and I/O devices or interfaces as illustrated and described, for example, in connection with FIG. 4. The layer 150 also may comprise programmed instructions that are configured to support virtualization, containerization, or other technologies.

For purposes of illustrating a clear example, FIG. 1 shows a limited number of instances of certain functional elements. However, in other embodiments, there may be any number of such elements. For example, embodiments may use thousands or millions of different mobile computing devices 104 associated with different users. Further, the system 130 and/or external data server computer 108 may be implemented using two or more processors, cores, clusters, or instances of physical machines or virtual machines, configured in a discrete location or co-located with other elements in a datacenter, shared computing facility or cloud computing facility.

2.2. Application Program Overview

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

In an embodiment, user 102 interacts with agricultural intelligence computer system 130 using field manager computing device 104 configured with an operating system and one or more application programs or apps; the field manager computing device 104 also may interoperate with the agricultural intelligence computer system independently and automatically under program control or logical control and direct user interaction is not always required. Field manager computing device 104 broadly represents one or more of a smart phone, PDA, tablet computing device, laptop computer, desktop computer, workstation, or any other computing device capable of transmitting and receiving information and performing the functions described herein. Field manager computing device 104 may communicate via a network using a mobile application stored on field manager computing device 104, and in some embodiments, the device may be coupled using a cable 113 or connector to the sensor 112 and/or controller 114. A particular user 102 may own, operate or possess and use, in connection with system 130, more than one field manager computing device 104 at a time.

The mobile application may provide client-side functionality, via the network to one or more mobile computing devices. In an example embodiment, field manager computing device 104 may access the mobile application via a web browser or a local client application or app. Field manager computing device 104 may transmit data to, and receive data from, one or more front-end servers, using web-based protocols or formats such as HTTP, XML, and/or JSON, or app-specific protocols. In an example embodiment, the data may take the form of requests and user information input, such as field data, into the mobile computing device. In some embodiments, the mobile application interacts with location tracking hardware and software on field manager computing device 104 which determines the location of field manager computing device 104 using standard tracking techniques such as multilateration of radio signals, the global positioning system (GPS), WiFi positioning systems, or other methods of mobile positioning. In some cases, location data or other data associated with the device 104, user 102, and/or user account(s) may be obtained by queries to an operating system of the device or by requesting an app on the device to obtain data from the operating system.

In an embodiment, field manager computing device 104 sends field data 106 to agricultural intelligence computer system 130 comprising or including, but not limited to, data values representing one or more of: a geographical location of the one or more fields, tillage information for the one or more fields, crops planted in the one or more fields, and soil data extracted from the one or more fields. Field manager computing device 104 may send field data 106 in response to user input from user 102 specifying the data values for the one or more fields. Additionally, field manager computing device 104 may automatically send field data 106 when one or more of the data values becomes available to field manager computing device 104. For example, field manager computing device 104 may be communicatively coupled to remote sensor 112 and/or application controller 114. In response to receiving data indicating that application controller 114 released water onto the one or more fields, field manager computing device 104 may send field data 106 to agricultural intelligence computer system 130 indicating that water was released on the one or more fields. Field data 106 identified in this disclosure may be input and communicated using electronic digital data that is communicated between computing devices using parameterized URLs over HTTP, or another suitable communication or messaging protocol.

A commercial example of the mobile application is CLIMATE FIELDVIEW, commercially available from The Climate Corporation, San Francisco, Calif. The CLIMATE FIELDVIEW application, or other applications, may be modified, extended, or adapted to include features, functions, and programming that have not been disclosed earlier than the filing date of this disclosure. In one embodiment, the mobile application comprises an integrated software platform that allows a grower to make fact-based decisions for their operation because it combines historical data about the grower's fields with any other data that the grower wishes to compare. The combinations and comparisons may be performed in real time and are based upon scientific models that provide potential scenarios to permit the grower to make better, more informed decisions.

FIG. 2 illustrates two views of an example logical organization of sets of instructions in main memory when an example mobile application is loaded for execution. In FIG. 2, each named element represents a region of one or more pages of RAM or other main memory, or one or more blocks of disk storage or other non-volatile storage, and the programmed instructions within those regions. In one embodiment, in view (a), a mobile computer application 200 comprises account-fields-data ingestion-sharing instructions 202, overview and alert instructions 204, digital map book instructions 206, seeds and planting instructions 208, nitrogen instructions 210, weather instructions 212, field health instructions 214, and performance instructions 216.

In one embodiment, a mobile computer application 200 comprises account-fields-data ingestion-sharing instructions 202 which are programmed to receive, translate, and ingest field data from third party systems via manual upload or APIs. Data types may include field boundaries, yield maps, as-planted maps, soil test results, as-applied maps, and/or management zones, among others. Data formats may include shape files, native data formats of third parties, and/or farm management information system (FMIS) exports, among others. Receiving data may occur via manual upload, e-mail with attachment, external APIs that push data to the mobile application, or instructions that call APIs of external systems to pull data into the mobile application. In one embodiment, mobile computer application 200 comprises a data inbox. In response to receiving a selection of the data inbox, the mobile computer application 200 may display a graphical user interface for manually uploading data files and importing uploaded files to a data manager.

In one embodiment, digital map book instructions 206 comprise field map data layers stored in device memory and are programmed with data visualization tools and geospatial field notes. This provides growers with convenient information close at hand for reference, logging and visual insights into field performance. In one embodiment, overview and alert instructions 204 are programmed to provide an operation-wide view of what is important to the grower, and timely recommendations to take action or focus on particular issues. This permits the grower to focus time on what needs attention, to save time and preserve yield throughout the season. In one embodiment, seeds and planting instructions 208 are programmed to provide tools for seed selection, hybrid placement, and script creation, including variable rate (VR) script creation, based upon scientific models and empirical data. This enables growers to maximize yield or return on investment through optimized seed purchase, placement and population.

In one embodiment, script generation instructions 205 are programmed to provide an interface for generating scripts, including variable rate (VR) fertility scripts. The interface enables growers to create scripts for field implements, such as nutrient applications, planting, and irrigation. For example, a planting script interface may comprise tools for identifying a type of seed for planting. Upon receiving a selection of the seed type, mobile computer application 200 may display one or more fields broken into management zones, such as the field map data layers created as part of digital map book instructions 206. In one embodiment, the management zones comprise soil zones along with a panel identifying each soil zone and a soil name, texture, drainage for each zone, or other field data. Mobile computer application 200 may also display tools for editing or creating such, such as graphical tools for drawing management zones, such as soil zones, over a map of one or more fields. Planting procedures may be applied to all management zones or different planting procedures may be applied to different subsets of management zones. When a script is created, mobile computer application 200 may make the script available for download in a format readable by an application controller, such as an archived or compressed format. Additionally and/or alternatively, a script may be sent directly to cab computer 115 from mobile computer application 200 and/or uploaded to one or more data servers and stored for further use.

In one embodiment, nitrogen instructions 210 are programmed to provide tools to inform nitrogen decisions by visualizing the availability of nitrogen to crops. This enables growers to maximize yield or return on investment through optimized nitrogen application during the season. Example programmed functions include displaying images such as SSURGO images to enable drawing of application zones and/or images generated from subfield soil data, such as data obtained from sensors, at a high spatial resolution (as fine as 10 meters or smaller because of their proximity to the soil); upload of existing grower-defined zones; providing an application graph and/or a map to enable tuning application(s) of nitrogen across multiple zones; output of scripts to drive machinery; tools for mass data entry and adjustment; and/or maps for data visualization, among others. "Mass data entry," in this context, may mean entering data once and then applying the same data to multiple fields that have been defined in the system; example data may include nitrogen application data that is the same for many fields of the same grower, but such mass data entry applies to the entry of any type of field data into the mobile computer application 200. For example, nitrogen instructions 210 may be programmed to accept definitions of nitrogen planting and practices programs and to accept user input specifying to apply those programs across multiple fields. "Nitrogen planting programs," in this context, refers to a stored, named set of data that associates: a name, color code or other identifier, one or more dates of application, types of material or product for each of the dates and amounts, method of application or incorporation such as injected or knifed in, and/or amounts or rates of application for each of the dates, crop or hybrid that is the subject of the application, among others. "Nitrogen practices programs," in this context, refers to a stored, named set of data that associates: a practices name; a previous crop; a tillage system; a date of primarily tillage; one or more previous tillage systems that were used; one or more indicators of application type, such as manure, that were used. Nitrogen instructions 210 also may be programmed to generate and cause displaying a nitrogen graph, which indicates projections of plant use of the specified nitrogen and whether a surplus or shortfall is predicted; in some embodiments, different color indicators may signal a magnitude of surplus or magnitude of shortfall. In one embodiment, a nitrogen graph comprises a graphical display in a computer display device comprising a plurality of rows, each row associated with and identifying a field; data specifying what crop is planted in the field, the field size, the field location, and a graphic representation of the field perimeter; in each row, a timeline by month with graphic indicators specifying each nitrogen application and amount at points correlated to month names; and numeric and/or colored indicators of surplus or shortfall, in which color indicates magnitude.

In one embodiment, the nitrogen graph may include one or more user input features, such as dials or slider bars, to dynamically change the nitrogen planting and practices programs so that a user may optimize his nitrogen graph. The user may then use his optimized nitrogen graph and the related nitrogen planting and practices programs to implement one or more scripts, including variable rate (VR) fertility scripts. Nitrogen instructions 210 also may be programmed to generate and cause displaying a nitrogen map, which indicates projections of plant use of the specified nitrogen and whether a surplus or shortfall is predicted; in some embodiments, different color indicators may signal a magnitude of surplus or magnitude of shortfall. The nitrogen map may display projections of plant use of the specified nitrogen and whether a surplus or shortfall is predicted for different times in the past and the future (such as daily, weekly, monthly or yearly) using numeric and/or colored indicators of surplus or shortfall, in which color indicates magnitude. In one embodiment, the nitrogen map may include one or more user input features, such as dials or slider bars, to dynamically change the nitrogen planting and practices programs so that a user may optimize his nitrogen map, such as to obtain a preferred amount of surplus to shortfall. The user may then use his optimized nitrogen map and the related nitrogen planting and practices programs to implement one or more scripts, including variable rate (VR) fertility scripts. In other embodiments, similar instructions to the nitrogen instructions 210 could be used for application of other nutrients (such as phosphorus and potassium) application of pesticide, and irrigation programs.

In one embodiment, weather instructions 212 are programmed to provide field-specific recent weather data and forecasted weather information. This enables growers to save time and have an efficient integrated display with respect to daily operational decisions.

In one embodiment, field health instructions 214 are programmed to provide timely remote sensing images highlighting in-season crop variation and potential concerns. Example programmed functions include cloud checking, to identify possible clouds or cloud shadows; determining nitrogen indices based on field images; graphical visualization of scouting layers, including, for example, those related to field health, and viewing and/or sharing of scouting notes; and/or downloading satellite images from multiple sources and prioritizing the images for the grower, among others.

In one embodiment, performance instructions 216 are programmed to provide reports, analysis, and insight tools using on-farm data for evaluation, insights and decisions. This enables the grower to seek improved outcomes for the next year through fact-based conclusions about why return on investment was at prior levels, and insight into yield-limiting factors. The performance instructions 216 may be programmed to communicate via the network(s) 109 to back-end analytics programs executed at agricultural intelligence computer system 130 and/or external data server computer 108 and configured to analyze metrics such as yield, hybrid, population, SSURGO, soil tests, or elevation, among others. Programmed reports and analysis may include yield variability analysis, benchmarking of yield and other metrics against other growers based on anonymized data collected from many growers, or data for seeds and planting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application as configured for tablet computers or smartphones may provide a full app experience or a cab app experience that is suitable for the display and processing capabilities of cab computer 115. For example, referring now to view (b) of FIG. 2, in one embodiment a cab computer application 220 may comprise maps-cab instructions 222, remote view instructions 224, data collect and transfer instructions 226, machine alerts instructions 228, script transfer instructions 230, and scouting-cab instructions 232. The code base for the instructions of view (b) may be the same as for view (a) and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 222 may be programmed to provide map views of fields, farms or regions that are useful in directing machine operation. The remote view instructions 224 may be programmed to turn on, manage, and provide views of machine activity in real-time or near real-time to other computing devices connected to the system 130 via wireless networks, wired connectors or adapters, and the like. The data collect and transfer instructions 226 may be programmed to turn on, manage, and provide transfer of data collected at machine sensors and controllers to the system 130 via wireless networks, wired connectors or adapters, and the like. The machine alerts instructions 228 may be programmed to detect issues with operations of the machine or tools that are associated with the cab and generate operator alerts. The script transfer instructions 230 may be configured to transfer in scripts of instructions that are configured to direct machine operations or the collection of data. The scouting-cab instructions 230 may be programmed to display location-based alerts and information received from the system 130 based on the location of the agricultural apparatus 111 or sensors 112 in the field and ingest, manage, and provide transfer of location-based scouting observations to the system 130 based on the location of the agricultural apparatus 111 or sensors 112 in the field.

2.3. Data Ingest to the Computer System

In an embodiment, external data server computer 108 stores external data 110, including soil data representing soil composition for the one or more fields and weather data representing temperature and precipitation on the one or more fields. The weather data may include past and present weather data as well as forecasts for future weather data. In an embodiment, external data server computer 108 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

In an embodiment, remote sensor 112 comprises one or more sensors that are programmed or configured to produce one or more observations. Remote sensor 112 may be aerial sensors, such as satellites, vehicle sensors, planting equipment sensors, tillage sensors, fertilizer or insecticide application sensors, harvester sensors, and any other implement capable of receiving data from the one or more fields. In an embodiment, application controller 114 is programmed or configured to receive instructions from agricultural intelligence computer system 130. Application controller 114 may also be programmed or configured to control an operating parameter of an agricultural vehicle or implement. For example, an application controller may be programmed or configured to control an operating parameter of a vehicle, such as a tractor, planting equipment, tillage equipment, fertilizer or insecticide equipment, harvester equipment, or other farm implements such as a water valve. Other embodiments may use any combination of sensors and controllers, of which the following are merely selected examples.

The system 130 may obtain or ingest data under user 102 control, on a mass basis from a large number of growers who have contributed data to a shared database system. This form of obtaining data may be termed "manual data ingest" as one or more user-controlled computer operations are requested or triggered to obtain data for use by the system 130. As an example, the CLIMATE FIELDVIEW application, commercially available from The Climate Corporation, San Francisco, Calif., may be operated to export data to system 130 for storing in the repository 160.

For example, seed monitor systems can both control planter apparatus components and obtain planting data, including signals from seed sensors via a signal harness that comprises a CAN backbone and point-to-point connections for registration and/or diagnostics. Seed monitor systems can be programmed or configured to display seed spacing, population and other information to the user via the cab computer 115 or other devices within the system 130. Examples are disclosed in U.S. Pat. No. 8,738,243 and US Pat. Pub. 20150094916, and the present disclosure assumes knowledge of those other patent disclosures.

Likewise, yield monitor systems may contain yield sensors for harvester apparatus that send yield measurement data to the cab computer 115 or other devices within the system 130. Yield monitor systems may utilize one or more remote sensors 112 to obtain grain moisture measurements in a combine or other harvester and transmit these measurements to the user via the cab computer 115 or other devices within the system 130.

In an embodiment, examples of sensors 112 that may be used with any moving vehicle or apparatus of the type described elsewhere herein include kinematic sensors and position sensors. Kinematic sensors may comprise any of speed sensors such as radar or wheel speed sensors, accelerometers, or gyros. Position sensors may comprise GPS receivers or transceivers, or WiFi-based position or mapping apps that are programmed to determine location based upon nearby WiFi hotspots, among others.

In an embodiment, examples of sensors 112 that may be used with tractors or other moving vehicles include engine speed sensors, fuel consumption sensors, area counters or distance counters that interact with GPS or radar signals, PTO (power take-off) speed sensors, tractor hydraulics sensors configured to detect hydraulics parameters such as pressure or flow, and/or and hydraulic pump speed, wheel speed sensors or wheel slippage sensors. In an embodiment, examples of controllers 114 that may be used with tractors include hydraulic directional controllers, pressure controllers, and/or flow controllers; hydraulic pump speed controllers; speed controllers or governors; hitch position controllers; or wheel position controllers provide automatic steering.

In an embodiment, examples of sensors 112 that may be used with seed planting equipment such as planters, drills, or air seeders include seed sensors, which may be optical, electromagnetic, or impact sensors; downforce sensors such as load pins, load cells, pressure sensors; soil property sensors such as reflectivity sensors, moisture sensors, electrical conductivity sensors, optical residue sensors, or temperature sensors; component operating criteria sensors such as planting depth sensors, downforce cylinder pressure sensors, seed disc speed sensors, seed drive motor encoders, seed conveyor system speed sensors, or vacuum level sensors; or pesticide application sensors such as optical or other electromagnetic sensors, or impact sensors. In an embodiment, examples of controllers 114 that may be used with such seed planting equipment include: toolbar fold controllers, such as controllers for valves associated with hydraulic cylinders; downforce controllers, such as controllers for valves associated with pneumatic cylinders, airbags, or hydraulic cylinders, and programmed for applying downforce to individual row units or an entire planter frame; planting depth controllers, such as linear actuators; metering controllers, such as electric seed meter drive motors, hydraulic seed meter drive motors, or swath control clutches; hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In an embodiment, examples of sensors 112 that may be used with tillage equipment include position sensors for tools such as shanks or discs; tool position sensors for such tools that are configured to detect depth, gang angle, or lateral spacing; downforce sensors; or draft force sensors. In an embodiment, examples of controllers 114 that may be used with tillage equipment include downforce controllers or tool position controllers, such as controllers configured to control tool depth, gang angle, or lateral spacing.

In an embodiment, examples of sensors 112 that may be used in relation to apparatus for applying fertilizer, insecticide, fungicide and the like, such as on-planter starter fertilizer systems, subsoil fertilizer applicators, or fertilizer sprayers, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors such as accelerometers disposed on sprayer booms. In an embodiment, examples of controllers 114 that may be used with such apparatus include pump speed controllers; valve controllers that are programmed to control pressure, flow, direction, PWM and the like; or position actuators, such as for boom height, subsoiler depth, or boom position.

In an embodiment, examples of sensors 112 that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors; grain loss sensors, including impact, optical, or capacitive sensors; header operating criteria sensors such as header height, header type, deck plate gap, feeder speed, and reel speed sensors; separator operating criteria sensors, such as concave clearance, rotor speed, shoe clearance, or chaffer clearance sensors; auger sensors for position, operation, or speed; or engine speed sensors. In an embodiment, examples of controllers 114 that may be used with harvesters include header operating criteria controllers for elements such as header height, header type, deck plate gap, feeder speed, or reel speed; separator operating criteria controllers for features such as concave clearance, rotor speed, shoe clearance, or chaffer clearance; or controllers for auger position, operation, or speed.

In an embodiment, examples of sensors 112 that may be used with grain carts include weight sensors, or sensors for auger position, operation, or speed. In an embodiment, examples of controllers 114 that may be used with grain carts include controllers for auger position, operation, or speed.

In an embodiment, examples of sensors 112 and controllers 114 may be installed in unmanned aerial vehicle (UAV) apparatus or "drones." Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus. Such controllers may include guidance or motor control apparatus, control surface controllers, camera controllers, or controllers programmed to turn on, operate, obtain data from, manage and configure any of the foregoing sensors. Examples are disclosed in U.S. patent application Ser. No. 14/831,165 and the present disclosure assumes knowledge of that other patent disclosure.

In an embodiment, sensors 112 and controllers 114 may be affixed to soil sampling and measurement apparatus that is configured or programmed to sample soil and perform soil chemistry tests, soil moisture tests, and other tests pertaining to soil. For example, the apparatus disclosed in U.S. Pat. Nos. 8,767,194 and 8,712,148 may be used, and the present disclosure assumes knowledge of those patent disclosures.

2.4. Process Overview-Agronomic Model Training

In an embodiment, the agricultural intelligence computer system 130 is programmed or configured to create an agronomic model. In this context, an agronomic model is a data structure in memory of the agricultural intelligence computer system 130 that comprises field data 106, such as identification data and harvest data for one or more fields. The agronomic model may also comprise calculated agronomic properties which describe either conditions which may affect the growth of one or more crops on a field, or properties of the one or more crops, or both. Additionally, an agronomic model may comprise recommendations based on agronomic factors such as crop recommendations, irrigation recommendations, planting recommendations, and harvesting recommendations. The agronomic factors may also be used to estimate one or more crop related results, such as agronomic yield. The agronomic yield of a crop is an estimate of quantity of the crop that is produced, or in some examples the revenue or profit obtained from the produced crop.

In an embodiment, the agricultural intelligence computer system 130 may use a preconfigured agronomic model to calculate agronomic properties related to currently received location and crop information for one or more fields. The preconfigured agronomic model is based upon previously processed field data, including but not limited to, identification data, harvest data, fertilizer data, and weather data. The preconfigured agronomic model may have been cross validated to ensure accuracy of the model. Cross validation may include comparison to ground truthing that compares predicted results with actual results on a field, such as a comparison of precipitation estimate with a rain gauge at the same location or an estimate of nitrogen content with a soil sample measurement.

Figure 3:
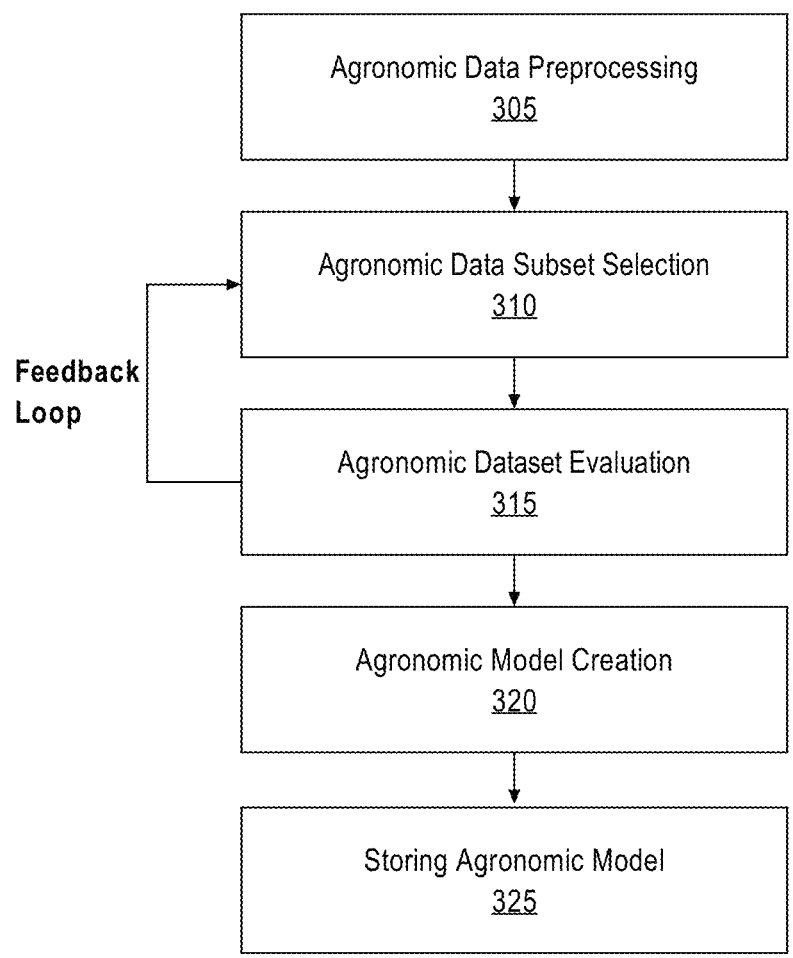
FIG. 3 illustrates a programmed process by which the agricultural intelligence computer system generates one or more preconfigured agronomic models using agronomic data provided by one or more data sources.

FIG. 3 illustrates a programmed process by which the agricultural intelligence computer system generates one or more preconfigured agronomic models using field data provided by one or more data sources. FIG. 3 may serve as an algorithm or instructions for programming the functional elements of the agricultural intelligence computer system 130 to perform the operations that are now described.

At block 305, the agricultural intelligence computer system 130 is configured or programmed to implement agronomic data preprocessing of field data received from one or more data sources. The field data received from one or more data sources may be preprocessed for the purpose of removing noise and distorting effects within the agronomic data including measured outliers that would bias received field data values. Embodiments of agronomic data preprocessing may include, but are not limited to, removing data values commonly associated with outlier data values, specific measured data points that are known to unnecessarily skew other data values, data smoothing techniques used to remove or reduce additive or multiplicative effects from noise, and other filtering or data derivation techniques used to provide clear distinctions between positive and negative data inputs.

At block 310, the agricultural intelligence computer system 130 is configured or programmed to perform data subset selection using the preprocessed field data in order to identify datasets useful for initial agronomic model generation. The agricultural intelligence computer system 130 may implement data subset selection techniques including, but not limited to, a genetic algorithm method, an all subset models method, a sequential search method, a stepwise regression method, a particle swarm optimization method, and an ant colony optimization method. For example, a genetic algorithm selection technique uses an adaptive heuristic search algorithm, based on evolutionary principles of natural selection and genetics, to determine and evaluate datasets within the preprocessed agronomic data.

At block 315, the agricultural intelligence computer system 130 is configured or programmed to implement field dataset evaluation. In an embodiment, a specific field dataset is evaluated by creating an agronomic model and using specific quality thresholds for the created agronomic model. Agronomic models may be compared using cross validation techniques including, but not limited to, root mean square error of leave-one-out cross validation (RMSECV), mean absolute error, and mean percentage error. For example, RMSECV can cross validate agronomic models by comparing predicted agronomic property values created by the agronomic model against historical agronomic property values collected and analyzed. In an embodiment, the agronomic dataset evaluation logic is used as a feedback loop where agronomic datasets that do not meet configured quality thresholds are used during future data subset selection steps (block 310).

At block 320, the agricultural intelligence computer system 130 is configured or programmed to implement agronomic model creation based upon the cross validated agronomic datasets. In an embodiment, agronomic model creation may implement multivariate regression techniques to create preconfigured agronomic data models.

At block 325, the agricultural intelligence computer system 130 is configured or programmed to store the preconfigured agronomic data models for future field data evaluation.

2.5 Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

3. Supervised Neural Network with Unknown Truth 3.1 Process Overview

In an embodiment, a neural network is trained to predict rainfall measurements on the ground from radar observations made aloft, despite the fact that the radar observations are indirect measures of rainfall expected on the ground. Once trained, the network is deployed to predict rainfall based on future instantaneous radar observations.

Radars provide radar observations that include return echo information received by the radars from targets such as water droplets in clouds. Therefore, the radar observations are not direct measures of rainfall. In contrast, rain gauges provide actual rainfall measurements that are direct measures of rainfall. In an embodiment, the presented approach solves the problem of using the radar observations, which are indirect measures of rainfall, and rain gauges measurements, which are direct measures of rainfall, to predict rainfall.

In an embodiment, a neural network implements a backward propagating rain rate model. The network uses the model to fit radar observations to actual rainfall measurements. Output generated by the network corresponds to a predicted rainfall measure. The predicted rainfall measure and actual rainfall measures are used to compute an error. The error is back propagated to continue the training process of the network. Once trained, the network is deployed to predict rainfall if instantaneous radar observations are provided.

In an embodiment, fitting radar observations to rain gauge observations is implemented by creating a latent variable, called a predicted rain rate. The predicted rain rate and actual rainfall measurements are used to compute a predicted rain rate error, and the error is back propagated to nodes of the neural network. Hence, the neural network is trained using the radar observations, as well as the back propagated rain rate errors. During each iteration of the training, the back propagated rain rate errors and new rainfall measurements are used. The process is repeated until the predicted rain rate error is smaller than a threshold value. Once the network is trained, the network may be deployed to predict rain rates when future radar observations are provided.

3.2. Radar Observations

A radar system sends directional pulses of the microwave radiation and awaits responses to the pulses as the pulses bounce off small particles of rain droplets. Returned echoes from the particles are often referred to as reflectivity, and denoted using "Z." An amount of rainfall ("R") may be predicted from the radar observations, if relationships between the radar observations and the predicted rainfall are known.

There are several approaches for determining one or more relationships between radar observations and the rain rates ("Z-R relationships"). Z-R relationships may be verified using readings received from rain gauges measuring rainfall amounts on the ground.

Z-R relationships are not unique as there can be different rainfall rates for a particular reflectivity, and there can be different reflectivity values for a particular rainfall rate. Z depends on the raindrop size distribution and the size of the drops. R depends on the raindrop size distribution, the size of the drops, and the fall velocity for a given drop diameter. The correlation may be represented using the following expression:

$$Z=\text{Integral}[N(D)D^6dD] R=(PI/6)*\text{Integral}[N(D)D^3W(D)dD] \quad (1)$$

where Z is a reflectivity factor, R is a rainfall rate, D is a raindrop diameter, N(D) is a number of drops of given diameter per cubic meter, and W is a fall velocity for a given diameter. Equation (1) is usually referred to as a theoretical definition of reflectivity Z.

However, some weather radars, such as the WSR-88D radar, are unable to observe a raindrop size distribution or a raindrop size. This limitation of some radar systems may be the basis for deriving a simplified equation for determining Z. An example of the simplified equation is the following:

$$Z=(\text{Power Returned}*\text{Target range}^2)/\text{radar\_constant} \quad (2)$$

where Power Returned is the amount of energy received back at a weather radar, Target range is a constant value, and radar_constant is another constant.

Some weather radars, such as the WSR-57 radar, rely on the Z-R relationship expressed as:

$$Z=200*R^{1.6} \quad (3)$$

where R is rain rate, and "1.6" is an empirically determined constant.

Some other weather radars, such as the WSR-88D radar, rely on the Z-R relationship expressed as:

$$Z=300*R^{1.4} \quad (4)$$

where R is rain rate, and "1.4" is another empirically determined constant.

However, the inventors have found, in an inventive moment, that the most useful equation for expressing a Z-R relationship is:

$$Z=A*R^b \quad (5)$$

where R is rain rate, and A and b are empirically determined constants. A and b in equation (5) may be determined, for example, by using actual measurements provided by rain gauges of rainfall amounts. The process of determining A and B for equation (5) using a neural network may be referred to as a training process of the neural network. Equation (5) may also be transformed to represent R as a function of Z. In various embodiments, any of equation (1) to equation (5), inclusive, may be implemented in one or more computer programs in which data values and constants shown in the equations are stored in electronic digital memory and the mathematical transformations represented in the equations are implemented using programmed instructions.

3.3. Neural Network Training

A rain radar may provide various types of observations, including reflectivity measurements, differential phase measurements, and differential reflectivity measurements, which are received as digital datasets at a computer system that is programmed to implement the processes herein. The observations represented in the datasets may refer to areas located near a particular location, specified by for example, geographical latitude and longitude parameters. The observations may be provided as input to a rain rate prediction computer system implementing or programmed to execute a rain rate prediction model as a set of program instructions.

The rain rate prediction system may process the received input observation datasets, and generate output representing a predicted rain rate. For example, if the observations represent reflectivity information for a particular time period, then the system may process the received observations using instructions that implement the rain rate prediction model to generate a predicted rainfall rate that is expected to fall within the particular time period. The predicted rainfall rate for the particular time period may be generated by numerically integrating, over the time period, the predicted rainfall rates that have been computed for the time points within the particular time period. The resulting predicted rainfall rate then may be used to predict a rainfall amount at the particular location and during the particular time period.

Figure 7:
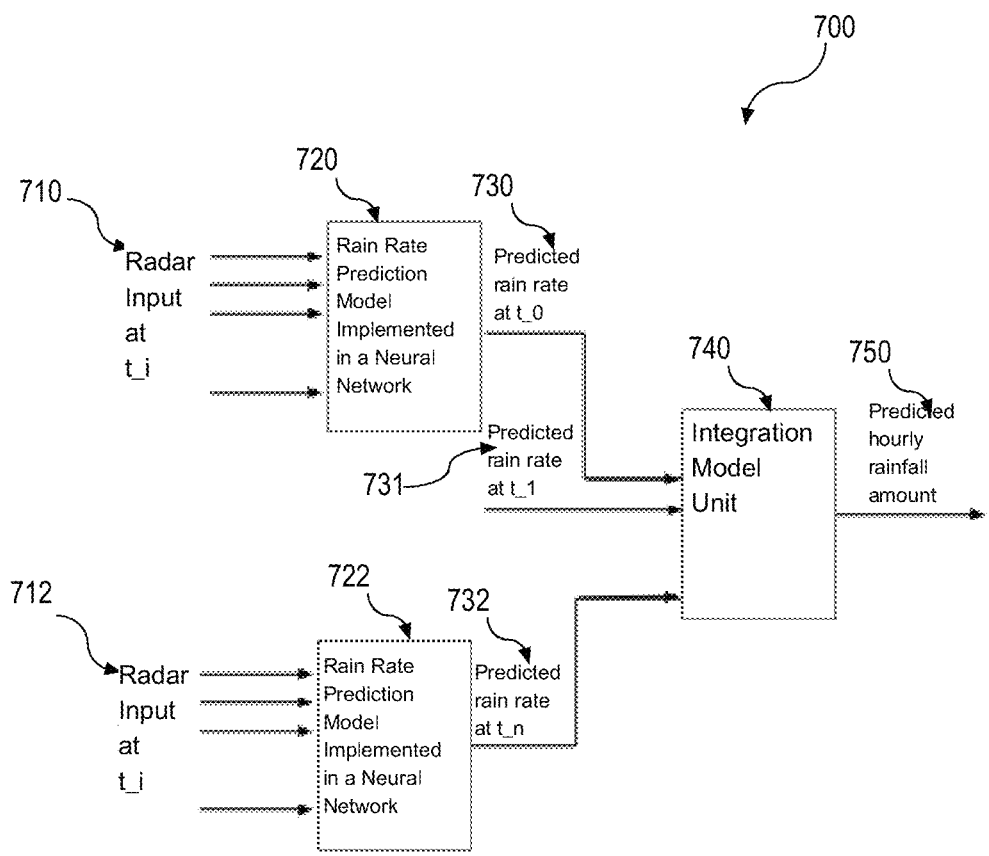
FIG. 7 depicts an example embodiment of a model environment used to train a neural network to predict rain rates.

FIG. 7 depicts an example embodiment of a model environment that can be used to train a neural network to predict rain rates. In an embodiment, a model environment 700 includes a plurality of inputs 710, 712 that correspond to radar observation data received from a radar system at different time points. In the depicted example, input 710 includes radar observation data received at t_0, while input 712 includes radar observation data received at t_n. Other radar observation data, such as the data at t_1 may also be used in model environment 700.

Model environment 700 also includes a plurality of rain rate prediction models implemented in neural networks 720, 722. Each of rain rate prediction networks 720, 722 may implement a conversion of radar measurements, such as Z, to a rainfall amount R. The conversion may include an implementation of equation (5).

Input 710 is provided to a rain rate prediction network 720. Upon receiving input 710, rain rate prediction network 720 generates a predicted rain rate 730 at t_0.

Input 712 is provided to a rain rate prediction network 722. Upon receiving input 720, rain rate prediction network 722 generates a predicted rain rate 730 at t_n. Other input, such as data at t_1 (not depicted in FIG. 7), may be provided to other rain prediction network (not depicted in FIG. 7), and used to generate a predicted rain rate 731 at t_1.

Predicted rain rates 730, 731, 732 (and other predicted rain rates determined for other time points) may be transmitted to an integration model unit 740. Integration model unit 740 may use the received predicted rain rates 730, 731, 732, and integrate the received rates over the time period t_n–t_0 to determine a predicted rainfall amount 750 for the time period t_n–t_0. For example, if the time difference between t_n and t_0 is sixty minutes, then predicted hourly rainfall amount 750 may represent the amount of rainfall expected to fall on a ground in a given area within an hour.

The above approach is referred to as a forward propagating approach because it allows propagating of data only in the forward direction from the input layer of a neural network to the output layer of the network. The forward propagating approach does not include any feedback loops or back propagating of the data.

3.4. Computing Rain Rates for a Time Period

In an embodiment, a total amount of rain predicted for a time period [t_0, t_N] is computed by applying the trapezoidal rule of numerical integration to rainfall predictions computed for each $t_i$, that belongs to the time period [t_0, t_N]. The trapezoidal rule may be expressed using the following equation:

$$R = \sum_{i=0}^{N-1} \frac{t_{i-1} + t_{i+1}}{2} r_i \qquad (6)$$

where R is the total amount of rain, $r_i$ is the rain rate predicted by at time $t_i$, and $t_0$ is zero, and $t_N$ is 60 when a sixty minute long time period is considered.

In an embodiment, equation (6) is implemented in computer programming as the final node of a neural network, and the total amount of rain R is an output of the final node of the neural network. The error difference value δ in R may be computed and back propagated as apportioned error difference value $δ_m$ as depicted in FIG. 8.

Figure 8:
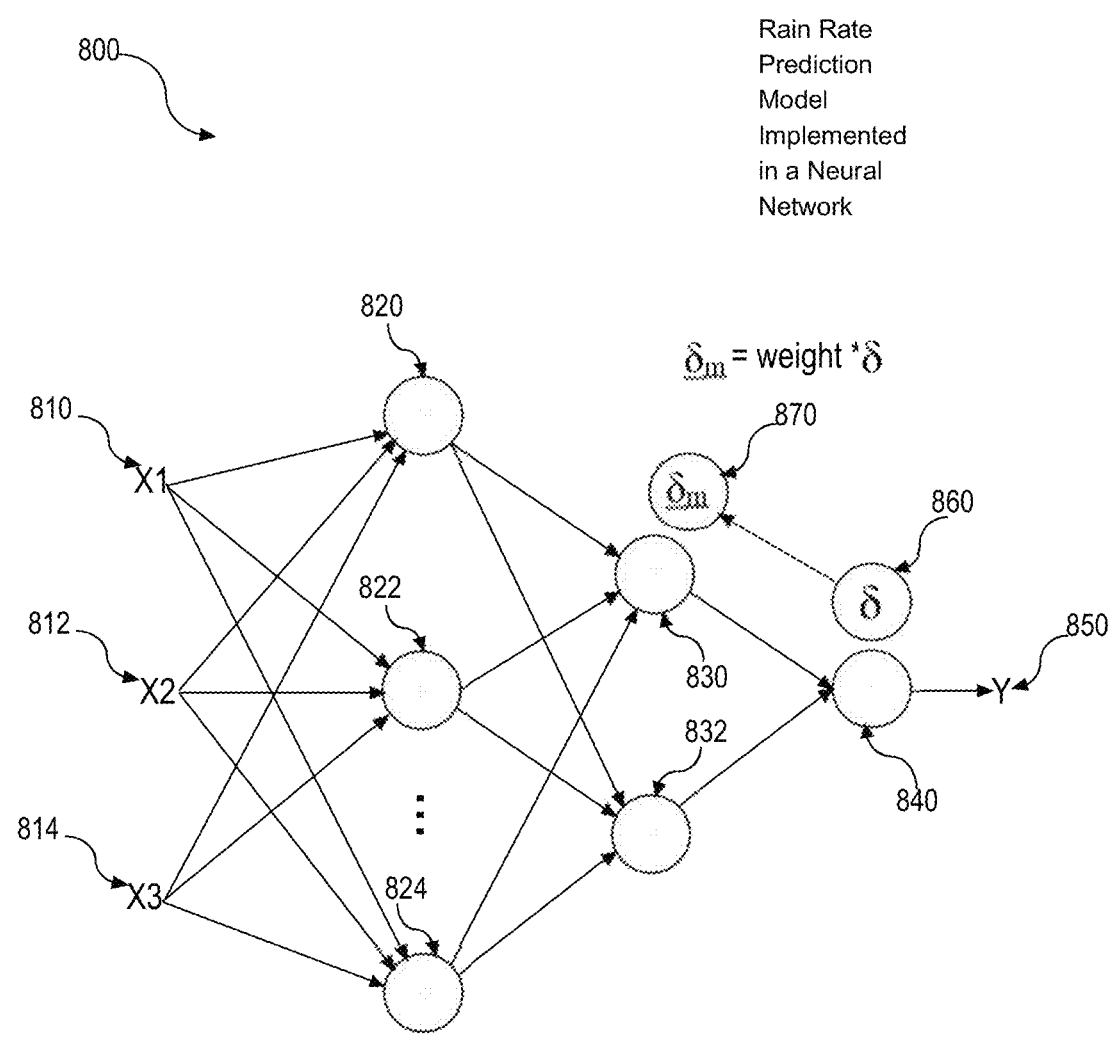
FIG. 8 depicts an example embodiment of computing errors in a neural network.

FIG. 8 depicts an example embodiment of computing errors in a neural network 800. A neural network is usually organized in layers. Layers usually include an input layer, one or more hidden layers, and an output layer. Neural network 800 comprises an input layer, including a plurality of inputs X1 810, X2 812, X3 814, one or more hidden layers, including a plurality of hidden nodes 820, 822, 824, 830, 832, and an output layer, including an output node 840 producing an output Y 850.

3.5. Forward Propagation

Figure 9A:
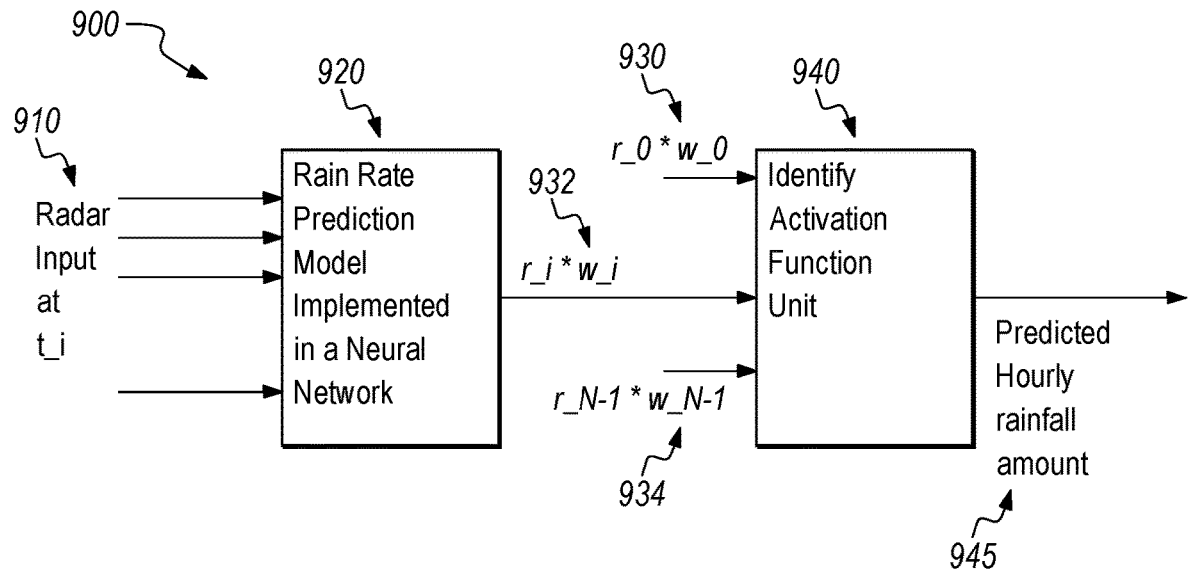
FIG. 9A depicts an example embodiment of forward propagating rain rate predictions through a rain rate prediction system.

FIG. 9A depicts an example embodiment of forward propagating rain rate predictions through a rain rate prediction system. In the depicted example, a rain rate prediction system 900 comprises a rain rate prediction neural network 920 and an identity activation function unit 940.

A plurality of inputs 910, corresponding to radar inputs at t_0, t_1, t_N, is provided to rain rate prediction neural network 920. Each of inputs includes radar input data received at given time points, such as t_0, t_1, t_N, and others.

In an embodiment, rain rate prediction neural network 920 receives inputs 910, corresponding to radar input at t_0, t_1, t_N, and uses inputs 910 to generate a plurality of predicted rain rates 930, 932, 934. Predicted rain rate 930 may correspond to a predicted rain rate at t_0. Predicted rain rate 932 may correspond to a predicted rain rate at t_1. Predicted rain rate 934 may correspond to a predicted rain rate at t_N. Predicted rain rates 930, 932, 934 may be generated by multiplying derived predicted rain rates by corresponding weights w, respectively.

A plurality of predicted rain rates 930, 932, 934 may be provided to an identity activation function unit 940. Identity activation function unit 940 may implement an integration model, such as integration model 740 described in FIG. 7. Integration model 740 may use the received predicted rain rates 930, 932, 934, and integrate the received rates over the time period t_N–t_0 to determine a predicted hourly rainfall amount 945 for the time period t_N–t_0. For example, if the time difference between t_N and t_0 is sixty minutes, then predicted hourly rainfall amount 945 represents the amount of rainfall expected to fall in a given area within an hour.

Propagating rain rate prediction system 900 allows to dispatch the predictions only forward, and not backward. Since no feedback or backward propagation of any data is allowed in propagating rain rate prediction system 900, training of such a system may be complicated and time consuming. The problem may be solved using an approach for back propagating rain rate predictions through the system. That approach is described in FIG. 9B, below.

4. Back Propagating a Rain Rate Prediction Model

In an embodiment, fitting radar observations to rain gauge observations is implemented by creating a latent variable called a predicted rain rate, computing a predicted rain rate error, and back propagating the predicted rain rate error to nodes of the neural network. This approach is referred to as a back propagating approach. The back propagating approach solves several problems that are present in a forward propagating approach.

4.1. Process Overview

Figure 9B:
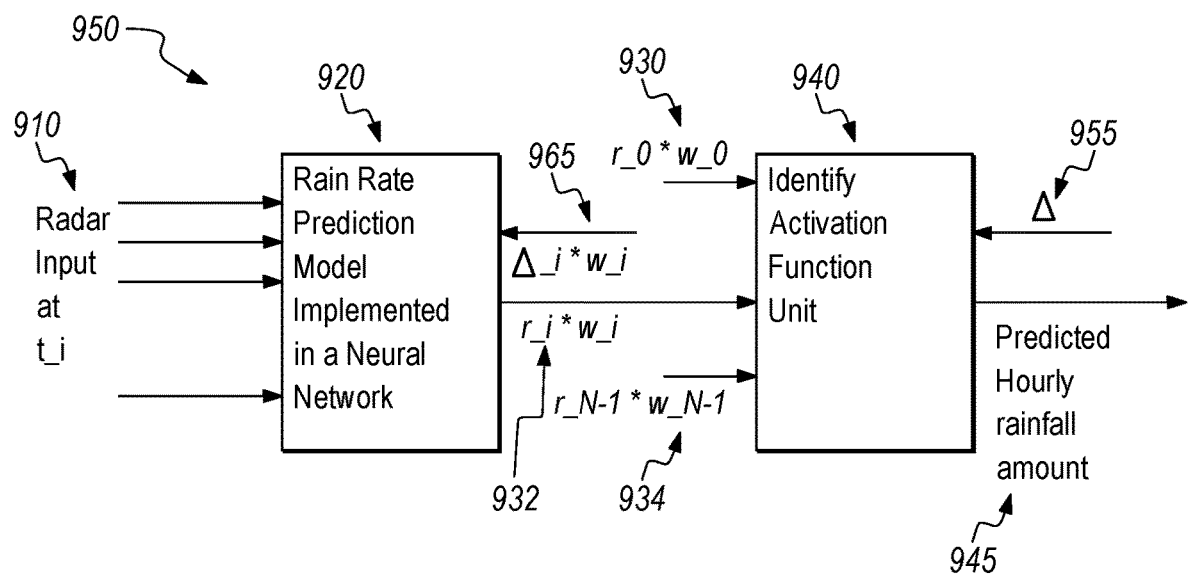
FIG. 9B depicts an example embodiment of back propagating rain rate predictions through a rain rate prediction system.

FIG. 9B depicts an example embodiment of back propagating rain rate predictions through a rain rate prediction system 920. In the depicted example, rain rate prediction system 920 comprises a rain rate prediction neural network 920 and an identity activation function unit 940. Identity activation function unit 940 may implement an integration model, such as integration model 740 described in FIG. 7.

A plurality of inputs 910, corresponding to radar inputs at t_0, t_1, t_N, is provided to rain rate prediction neural network 920. Each of the inputs includes radar input data received at given time points, such as t_0, t_1, t_N. Rain rate prediction network 920 uses inputs 910 to generate a plurality of predicted rain rates 930, 932, 934, for the time points t_0, t_1, t_N. Predicted rain rates 930, 932, 934 are provided to an identity activation function unit 940, implemented for example, as integration model 740 described in FIG. 7.

Integration model 740 may use the received predicted rain rates 930, 932, 934, and integrate received rates over the time period t_N–t_0 to determine a predicted rainfall amount 945 for the time period t_N–t_0. For example, if the time difference between t_N and t_0 is sixty minutes, then predicted hourly rainfall amount 945 represents the amount of rainfall expected to fall in a given area within an hour.

Predicted hourly rainfall amount 945 corresponds to the total amount of rain R determined by rain rate prediction neural network 920 for the time period t_N–t_0. An error difference value Δ955 is computed based on R, and error difference value Δ955 is apportioned to a plurality of corresponding apportioned error difference values Δ_0, Δ_1, Δ_N for the time points t_0, t_1, t_N, respectively.

Each of corresponding apportioned error difference values Δ_0, Δ_1, Δ_N may be multiplied by a corresponding weight value w_0, w_1, w_N, respectively. For example, for a time point t_i, corresponding apportioned error difference value Δ_i, corresponding to a time point t_i, is multiplied by w_i, and the result 965 is back propagated to rain rate prediction neural network 920. Furthermore, corresponding apportioned error difference value Δ_0, corresponding to a time point t_0, is multiplied by w_0, and the result is back propagated to rain rate prediction neural network 920, while error Δ_N, corresponding to a time point t_N, is multiplied by w_N, and the result is back propagated to rain rate prediction neural network 920.

The process of computing error difference value Δ955 and back propagating apportioned components of error difference value Δ955 may be repeated until error difference value Δ955 meets certain criteria. Once error difference value Δ955 meets those criteria, the training process may be validated, and/or the network may be deployed to predict future rainfall.

4.2. Error Computation

Referring again to FIG. 8, error difference value δ860 may be computed using equation (6) applied to output Y 850. Output Y 850 corresponds to the total amount of rain R derived by hidden node 840. Error difference value δ860 may be computed based on R and actual rainfall measurements provided by for example, rain gauges. More specifically, error difference value δ860 may be computed as an error between the hourly prediction of the rain and the gauge reading of the actual rainfall for one hour.

In an embodiment, error difference value δ860 is apportioned according to a count of the nodes in a previous hidden layer of a neural network. For example, if the previous hidden layer includes two nodes 830, 932, then error difference value δ860 may be apportioned into two corresponding apportioned error difference values, including $δ_m$ 870 depicted in FIG. 8.

Each of the two errors may be multiplied by a corresponding weight value, and back propagated to previous hidden layer.

Weights used in the process may be associated with arrows depicted in FIG. 8. The weights may be initially set to a constant value, such as "1." Then, the weights may be modified based on back propagated error values.

In an embodiment, a single neural network 800 is used as a rain rate prediction model. In the forward propagation, rain rates are computed for each time point, and at output node 840, a numerical integral, corresponding to Y 850 is computed. Y 850 represents a total amount of rain R predicted for the time period t_N–t_0. Error difference value δ860 is computed and apportioned to the different time points using a standard back propagation algorithm. Errors apportioned to different time points are then back propagated to respective hidden nodes 830, 832, 820, 822, 824, and used to update weights associated with arrows depicted in FIG. 8.

4.3. Example Workflow

Figure 10:
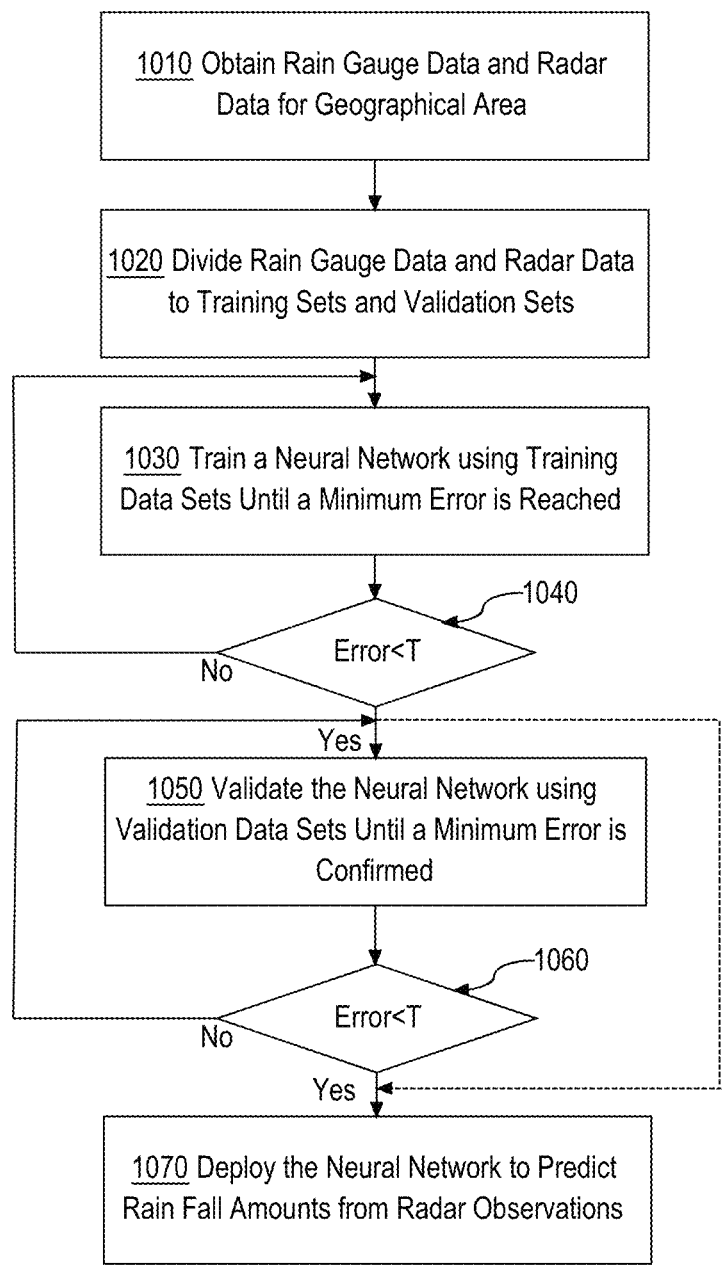
FIG. 10 is an example workflow for predicting rain rates by back propagating rain rate predictions through a rain rate prediction system.

FIG. 10 is an example workflow for predicting rain rates by back propagating a rain rate prediction model through a rain rate prediction system.

In step 1010, rain gauge data and radar data is obtained for a geographical region. The rain gauge data may be obtained from physical gauges, such as MADIS gauges. The radar data may be obtained from weather or rain radars, such as NEXRADs.

In step 1020, rain gauge data is divided into training rain gauge data and validation rain gauge data. Radar data is divided into a training radar data and validation radar data. Dividing the data into training data and validation data allows to separate the data into a group of data that is to be used to train a neural network and into a group of data that is to be used to validate the trained neural network. For example, if rain gauge data and radar data cover a thirty day long time period, then the rain gauge data corresponding to the first twenty days may be used to form a training rain gauge set, the rain gauge data corresponding to the remaining days may be used to form a validation rain gauge set, the radar data corresponding to the first twenty days may be used to form a training radar set, the radar data corresponding to the remaining days may be used to form a validation radar set In step 1030, a neural network is trained using training radar data and training rain gauge data. Training of the network may include providing training radar data as input to a neural network and comparing the output generated by the neural network with training rain gauge data. The generated output corresponds to a predicted rainfall amount for the same time period for which the rain gauge data and radar data was received.

The comparison may include computing a difference value between the generated output and the actual amount of rainfall computed based on the training rain gauge data for the time period. The difference value corresponds to an error measure. The difference value may be compared with a threshold value. If the difference value exceeds the threshold value, then the difference value is apportioned for each item in the radar training set, and back propagated through a neural network to adjust for example, the weights used by hidden nodes of the network.

The training process may be repeated using training radar set, and a new output is generated by the network at each iteration. The output is compared with training rain gauge data to determine an error. The error is apportioned, and the apportioned error is back propagated to the hidden nodes of the network. The training process may be repeated for all training radar data and all training rain gauge data, and until the error satisfies certain criteria.

An example of the training process was described in FIG. 9B. As described in FIG. 9B, training radar data may be provided as radar input 910 to radar prediction network 920. Each of the outputs generated by the radar prediction network 920 may be multiplied by a corresponding weight and results 930, 932, 934 are provided to identity activation function unit 940. Identity activation function unit 940 generates predicted hourly rainfall amount 945, which is compared with training rain gauge data. Error difference value Δ955 may be computed as a difference between predicted hourly rainfall amount 945 and actual hourly rainfall amount computed from the training rain gauge data.

Error difference value Δ955 may be apportioned between hidden nodes of the neural network, and each hidden node may receive a back propagated error amount multiplied by a corresponding weight. The back propagating of the apportioned error amount is performed for each hidden node. This completes one iteration of the training process.

The iterative training process may be repeated multiple times and until error difference value Δ955 meets certain criteria. For example, the training process may be iterated until a minimum error is reached. A minimum error may be for example, a minimum mean absolute error (MAE) computed using any of the MEA approached. For example, the training process may be repeated until error difference value Δ955 does not exceed the minimum error value, also referred to as a threshold.

In step 1040, an error computed by a rain rate prediction system is compared with a threshold value. If the error does not exceed the threshold value, then step 1050 is performed. Otherwise, step 1030 is performed.

In step 1050, upon determining that an error in a predicted hourly rainfall amount does not exceed a threshold value, a validation process may be initiated. A validation process may be similar to the iterative training process with the exception that it is performed on validation radar data and validation rain gauge data. The validation may include step 1060, used to determine whether an error computed by a rain rate prediction system indeed does not exceed a threshold value. If the rain rate prediction system does not exceed a threshold value, then step 1070 is performed; otherwise step 1050 is repeated.

In some embodiments, steps 1050-1060 are omitted, and step 1070 is performed. In this step, it is assumed that a neural network has been sufficiently trained (and validated) and can be deployed to predict rainfall amounts from future radar observations.

5. Weight Values

Initial weight values may be set either to constant values, or computed using formulas. One of the formulas may be derived directly from time point values. For example, a weight for w_i may be computed using the following formula:

$$W_i = \frac{t_{i-1} + t_{i+1}}{2} \quad (7)$$

where t_0 is zero, t_i-1 is a time point value at i-1, t_i+1 is a time point value at i+1.

For example, a weight w_i may be computed as a half of the sum of two neighboring time point values t_i-1 and t_i+1. Hence, w_1 may be computed as half of t_0 and t_2, w_2 may be computed as a half of the sum of t_1 and t_3, and so forth.

In an embodiment, rain rate prediction model is implemented in a single neural network 920, and employs a backward propagation of error information. Error difference value 955 is computed and apportioned to the different time points using a standard backpropagation algorithm. Errors apportioned to different time points are then back propagated to respective hidden nodes of rain rate prediction network 920, and used to update the weights, respectively.

6. Variations

In an embodiment, rain rate prediction model employing a backward propagation uses a standard neural network software package to train the rain rate neural network. Examples of standard neural network software packages include encog Java available at the encog website having org as the top-level domain.

In an embodiment, an integration model, such as integration model 740 depicted in FIG. 7, uses fixed weights, and thus the weights are not updated as errors Δ_0, Δ_1, Δ_N are computed. The final error, computed as an error between the hourly prediction of a rainfall and the gauge readings of the actual rainfall, may be viewed as apportioning of the error rather than as backpropagation per se. Once the errors have been apportioned, the rain rate neural network may be trained with instantaneous radar variables as input.

Neural network packages typically require a target output value, not an error value. However, the target output value can be computed simply by adding the apportioned errors to the actual output of the network. This allows to reuse the neural network software packages as-is.

In an embodiment, target outputs are re-computed at each training iteration of a neural network. Since the target outputs are re-computed at each iteration, a training data set provided to the network usually changes at each iteration. For example, a training data set provided to the network for predicating a rain rate during the first hour may be different from a training data set provided to the network for predicting a rain rate during the second hour if the rain falls heavily during the first hour, and lessens a bit during the second hour.

Because a training data set changes at each iteration, it is preferable to use a neural network package that provides the ability to control each step of the iteration. Furthermore, since target values at each iteration are computed based on the current weights determined for the network based on the apportioned error, and because gauge value correspond to multiple input patterns, it may be necessary to employ a batch optimization algorithm to derive predictions of rain rate. Examples of the batch optimization algorithms include a scaled conjugate gradient (SCG) algorithm.

7. Training Datasets

A training dataset may be extracted from polarimetric NEXRAD and MADIS gauges configured to measure rain amounts. For a given time period of rain in a particular geographical region, the MADIS gauges located in the region usually report non-zero hourly accumulations for that time period. For the same time period, radar observations may also be received from one or more weather or rain radars and collected. It is assumed that the one or more radars collect radar data from the same geographical region as the particular geographical region on which the physical gauges are deployed. Each of the radars may be equipped with one or more volume scans that are configured to scan the data captured by the radar.

Radar data usually consists of a set of variables, corresponding to reflectivity, $Z_{SR}$, $\rho_{HV}$ and $K_{dp}$ of the lowest elevation scan of the radar pixel that covers the gauge that collected the radar data. Terrain and beam blockage are usually not considered and are not included in the radar data if the terrain is a geographic area that is mostly flat.

In an embodiment, in addition to the values of the radar variables at the radar pixel, the values within a 5×5 neighborhood (in the polar radar coordinates) are extracted, and the 10th, 50th and 90th percentile values are added as features to a neural network.

A traditional choice of an output node for a regression neural network is an identity node. However, in predicting rain rates, it is desirable to have an output node generate outputs bounded between zero and a maximum plausible value of the rain rate. For example, the output rain rate may be bounded between zero and 100 mm/hour, which is a typical maximum of the rain rate. In an embodiment, a sigmoidal transfer function is used at an output node to generate an output value. The output value may be multiplied by for example 100, to obtain a predicted rain rate.

In an embodiment, a neural network used to predict rain rates uses a hidden layer, and has twice as many hidden nodes as input nodes. In an attempt to reduce the size of the input dataset, the input data may be subjected to a simple quality control method. For example, pixels that are determined to not correspond to weather echoes at a particular time point based on their reflectivity, may have $Z_{DR}$, $\rho_{HV}$ values modified to a zero rain rate for that time point. A pixel may be considered to be weather only if at least two of the these conditions held:

$$Z>3 \text{ dBZ}, |ZDR|<2.3 \text{ dB and } \rho_{HV}>0.9 \quad (8)$$

where 3 dBZ, 2.3 dB, and 0.9 are constants that in reference to radar measurements indicate not measurable amounts of rain.

In a typical training dataset, low values of rain rate predominate the training dataset. Since this may skew the training process, to reduce the data skew, target gauge values may be transformed using a computed $g^{0.3}$ multiplier, where g is a target gauge value, and providing the transformed values to a neural network. Furthermore, a significance value may be computed for each input pattern and the neural network error function may be updated to weight the error from each pattern by its significance. In an embodiment, significance of a pattern is set to:

$$\frac{1}{0.22g - 1.16} \quad (9)$$

where g is the target gauge value.

Equation (9) may be derived by fitting the frequency of gauge measurements to a power law relationship and inverting the frequency to obtain the significance. Application of the significance allows to boost high-rain rate patterns in the input datasets because they are rare in actual datasets.

8. Approximating and Interpolating Radar Data

There are several approaches for approximating and interpolating radar observations before using the observations to train a rain rate prediction model. Some of the approaches are designed to deal with the issue that there is no truth ("labels" in machine learning terms) for the instantaneous (sporadic) rain rates. The ground truth exists only for accumulations in particular time period, such as accumulations within an hour, accumulations within two hours, or so. Because the number of radar inputs available over an hour is variable and sporadic (it depends on the volume scan collection strategy of the radar), it is not possible to simply provide all the radar measurements available over the hour as the input to a single-stage model.

In an embodiment, multiple radar observations, such as reflectivity, are collapsed over an hour into one or more representative measures of reflectivity over the hour and used to train a rain rate prediction model. In this approach, however, the representative measures may not capture a non-linear relationship between the input radar measurements and the predicted rain rate. The representative measures obtained by collapsing multiple radar observations may not be capable of capturing the non-linear distributions of reflectivity. Collapsed representations, which typically represent linear distributions, are rarely used to represent non-linear distributions of reflectivity, which are typically curve-shaped distributions. Therefore, using collapsed representations, such as a linear combination of the representative measurements over time as the input to a rain rate prediction model may not be very accurate.

In one embodiment, multiple radar observations are fit to a non-linear curve. A curve may be fit to the available radar measurements representing rain rates within an hour-time-period, and the coefficients of the curve may be used as inputs to train a rain rate prediction model. However, one of the drawbacks of that method is that determining the parametric form of such a curve might be difficult.

In an embodiment, based on received radar measurements, the missing measurements are interpolated, and the received and interpolated radar measurements are used to train a rain rate prediction model. For example, sixty radar measurements (data points) may be obtained for an hour-long time period, and used as the input to the rain rate prediction model. One of the drawbacks of that approach is that the approach is not taking any advantage of the fact that the rain rate relationship is independent of the time.

9. Extensions

In an embodiment, a machine learning approach to estimating hourly precipitation totals is capable of closely modeling actual gauge measurements. It may be possible to improve the approach by correcting and calibrating rain gauges and determining a resulting QPE.

The approach may also be improved by refining the accuracy of gauge measurements and using a wide range of gauge measurements. If a neural network is trained exclusively with radar data from the lowest tilt, then the neural network may not be accurately trained for predicting hail type precipitations, which are best determined by looking at higher tilts. However, if a wide range of gauge measurements are used during the training process, then the neural network may be able to predict various types of precipitation.

Furthermore, the approach may be improved by refining a variable selection to reduce the number of variables, and then adding radar measurements from higher tilts. Identifying the height of the bright band, and performing vertical profile of reflectivity correction, may also be helpful.

What is claimed is:

1. A computer-implemented data processing method comprising:
    using instructions that are programmed in a computer system comprising one or more processors and computer memory for;

receiving, at an input layer of a rain rate prediction neural network, radar observation data for a plurality of time points;

forward propagating the radar observation data via the rain rate prediction neural network to predict a plurality of rain rates for the plurality of time points;

determining, based on the plurality of rain rates, a predicted rainfall amount for a time period determined based on the plurality of time points;

comparing the predicted rainfall amount with an actual rainfall amount determined based on received rainfall measurements to determine an error difference value;

in response to determining that the error difference value does not satisfy one or more criteria:

apportioning the error difference value to each time point of the plurality of time points; wherein apportioning an error for a kth node in the rain rate prediction neural network having a kth weight includes computing an apportioned error difference value for the kth node by dividing the error difference value by a count of nodes and multiplying the computed apportioned error difference value by the kth weight to obtain a result;

backward propagating the result via the rain rate prediction neural network;

receiving new radar observation data; and forward propagating the new radar observation data to predict a new plurality of rain rates for the plurality of time points.

2. The method of claim 1, further comprising:
computing and outputting one or more predicted rain rate values with the rain rate prediction neural network, in response to determining that the error difference value satisfies the one or more criteria.

3. The method of claim 1, further comprising, using programmed instructions:
setting a weight value for each node of the rain rate prediction neural network to a specified constant value;
predicting the plurality of rain rates for the plurality of time points by multiplying the radar observation data at each node in one or more hidden layers of the rain rate prediction neural network by a corresponding weight value.

4. The method of claim 3, wherein multiplying the radar observation data at each node in the one or more hidden layers of the rain rate prediction neural network by a corresponding weight value includes transforming the radar observation data into predicted rain rates.

5. The method of claim 1, further comprising determining the predicted rainfall amount using programmed instructions by integrating the plurality of rain rates for the plurality of time points over the time period; wherein integrating the plurality of rain rates for the plurality of time points over the time period to determine the predicted rainfall amount comprises applying a trapezoidal rule of numerical integration to the plurality of rain rates.

6. The method of claim 1, wherein the error difference value represents an error between an hourly prediction of rain for the time period and rain gauge readings for the time period.

7. The method of claim 1, wherein apportioning the error difference value to each time point of the plurality of time points includes dividing the error difference value by the count of the nodes in the rain rate prediction neural network.

8. The method of claim 1, wherein the radar observation data comprises reflectivity measures that have been determined based on echo signals that were received by a radar system in response to, and based upon, emitting radar signals toward clouds; wherein the echo signals are the emitted radar signals reflected from the clouds.

9. The method of claim 1, wherein the received rainfall measurements comprise actual rainfall measurement values from a plurality of rain gauges.

10. The method of claim 1, wherein the one or more criteria comprise a threshold value, and further comprising comparing the error difference value to the threshold value to determine whether the error difference value exceeds the threshold value.

11. A data processing system comprising:
a memory;
one or more processors coupled to the memory and programmed, using instructions that are part of a rain rate prediction neural network, to:
receive, at an input layer of the rain rate prediction neural network, radar observation data for a plurality of time points;
forward propagate the radar observation data via the rain rate prediction neural network to predict a plurality of rain rates for the plurality of time points;
determine, based on the plurality of rain rates, a predicted rainfall amount for a time period determined based on the plurality of time points;
compare the predicted rainfall amount with an actual rainfall amount determined based on received rainfall measurements to determine an error difference value;
in response to determining that the error difference value does not satisfy one or more criteria:
apportion the error difference value to each time point of the plurality of time points;
wherein apportioning an error for a kth node in the rain rate prediction neural network having a kth weight includes computing an apportioned error difference value for the kth node by dividing the error difference value by a count of nodes and multiplying the apportioned error difference value by the kth weight to obtain a result;
backward propagate the result via the rain rate prediction neural network;
receive new radar observation data, and
forward propagate the new radar observation data to predict a new plurality of rain rates for the plurality of time points.

12. The data processing system of claim 11, wherein the one or more processors are programmed to compute and output one or more predicted rain rate values with the rain rate prediction neural network, in response to determining that the error difference value satisfies the one or more criteria.

13. The data processing system of claim 11, wherein the one or more processors are programmed to:
set a weight value for each node of the rain rate prediction neural network to a specified constant value;
predict the plurality of rain rates for the plurality of time points by multiplying the radar observation data at each node in one or more hidden layers of the rain rate prediction neural network by a corresponding weight value.

14. The data processing system of claim 13, wherein multiplying the radar observation data at each node in one or more hidden layers of the rain rate prediction neural network by a corresponding weight value includes transforming the radar observation data into predicted rain rates.

15. The data processing system of claim 11,
wherein the predicted rainfall amount is determined by integrating the plurality of rain rates for the plurality of time points over the time period;
wherein integrating the plurality of rain rates for the plurality of time points over the time period to determine the predicted rainfall amount comprises applying a trapezoidal rule of numerical integration to the plurality of rain rates.

16. The data processing system of claim 11, wherein the error difference value represents an error between an hourly prediction of rain for the time period and rain gauge readings for the time period.

17. The data processing system of claim 11, wherein apportioning the error difference value to each time point of the plurality of time points includes dividing the error difference value by the count of nodes in the rain rate prediction neural network.

18. The data processing system of claim 11, wherein the radar observation data comprises reflectivity measures that have been determined based on an echo signal received by a radar system in response to, and based upon, emitting radar signals toward clouds; wherein the echo signals are the emitted radar signals reflected from the clouds.

19. The data processing system of claim 11, wherein the received rainfall measurements comprise measurements of actual rainfall determined by a plurality of rain gauges.

20. The data processing system of claim 11, wherein the one or more criteria comprise a threshold value, and wherein the error difference value is compared with the threshold value to determine whether the error difference value exceeds the threshold value.

\* \* \* \* \*